US011855904B2

(12) United States Patent
McClenahan

(10) Patent No.: US 11,855,904 B2
(45) Date of Patent: Dec. 26, 2023

(54) AUTOMATED MIGRATION OF COMPUTE INSTANCES TO ISOLATED VIRTUAL NETWORKS

(71) Applicant: Amazon Technologies, Inc., Seattle, WA (US)

(72) Inventor: Weili Zhong McClenahan, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 259 days.

(21) Appl. No.: 16/684,920

(22) Filed: Nov. 15, 2019

(65) Prior Publication Data
US 2020/0092222 A1 Mar. 19, 2020

Related U.S. Application Data

(63) Continuation of application No. 14/658,965, filed on Mar. 16, 2015, now Pat. No. 10,484,297.

(51) Int. Cl.
*G06F 15/16* (2006.01)
*G06F 16/2457* (2019.01)
(Continued)

(52) U.S. Cl.
CPC .......... *H04L 47/70* (2013.01); *G06F 9/45558* (2013.01); *G06F 11/203* (2013.01);
(Continued)

(58) Field of Classification Search
None
See application file for complete search history.

(56) References Cited

U.S. PATENT DOCUMENTS 5,774,660 A * 6/1998 Brendel ............... H04L 9/40
709/239
6,581,090 B1 6/2003 Lindbo
(Continued)

FOREIGN PATENT DOCUMENTS

| CN | 102598591 | 7/2012 |
|---|---|---|
| EP | 1298853 | 4/2003 |
| EP | 1713231 | 10/2006 |

OTHER PUBLICATIONS

Amazon, "Elastic Load Balancing" User Guide, 2023, https://docs.aws.amazon.com/pdfs/elasticloadbalancing/latest/userguide/elb-ug.pdf#migrate-classic-load-balancer (Year: 2023).*
(Continued)

*Primary Examiner* — Nicholas R Taylor
*Assistant Examiner* — Ho T Shiu
(74) *Attorney, Agent, or Firm* — Alexander A. Knapp; Kowert, Hood, Munyon, Rankin & Goetzel, P.C.

(57) ABSTRACT

A migration manager (MM) identifies a source group of compute instances (at a first partition of a provider network) to be migrated to an isolated virtual network (IVN) implemented in a second partition. The MM triggers the establishment within the IVN of an equivalence group of instances corresponding to the source group instances. Connectivity between the equivalence group and a first load balancer which was being used for the source group in the first partition is maintained by modifying one or more configuration settings. After a replacement load balancer is established within the IVN, the first load balancer is decommissioned.

20 Claims, 12 Drawing Sheets

(51) Int. Cl.
  *H04L 12/66* (2006.01)
  *H04L 67/1008* (2022.01)
  *H04L 47/70* (2022.01)
  *G06F 9/455* (2018.01)
  *H04L 67/1004* (2022.01)
  *H04L 41/50* (2022.01)
  *G06F 11/20* (2006.01)
  *H04L 67/1031* (2022.01)

(52) U.S. Cl.
  CPC .. *G06F 2009/4557* (2013.01); *H04L 41/5096* (2013.01); *H04L 67/1004* (2013.01); *H04L 67/1031* (2013.01)

(56) References Cited

U.S. PATENT DOCUMENTS

| | | | |
|---|---|---|---|
| 8,369,345 | B1 | 2/2013 | Raghunathan et al. |
| 8,423,646 | B2 | 4/2013 | Jamjoom et al. |
| 8,615,579 | B1 | 12/2013 | Vincent et al. |
| 8,732,705 | B2 | 5/2014 | White |
| 8,880,773 | B2 | 11/2014 | Costa |
| 9,166,992 | B1* | 10/2015 | Stickle ............ H04L 63/1425 |
| 9,424,429 | B1* | 8/2016 | Roth ............... G06F 21/604 |
| 9,451,013 | B1 | 9/2016 | Roth et al. |
| 9,787,671 | B1* | 10/2017 | Bogrett ............ H04L 63/08 |
| 9,916,545 | B1 | 3/2018 | de Kadt et al. |
| 9,934,273 | B1 | 4/2018 | MacCarthaigh |
| 10,484,297 | B1 | 11/2019 | McClenahan |
| 2005/0055435 | A1* | 3/2005 | Gbadegesin ........ H04L 67/1008 709/224 |
| 2005/0172161 | A1 | 8/2005 | Cruz et al. |
| 2005/0193103 | A1 | 9/2005 | Drabik |
| 2006/0251088 | A1 | 11/2006 | Thubert et al. |
| 2007/0239987 | A1 | 10/2007 | Hoole et al. |
| 2008/0034200 | A1 | 2/2008 | Polcha et al. |
| 2008/0225875 | A1 | 9/2008 | Wray et al. |
| 2009/0288084 | A1 | 11/2009 | Astete et al. |
| 2010/0094990 | A1 | 4/2010 | Ben-Yehuda et al. |
| 2010/0287263 | A1* | 11/2010 | Liu ............... G06F 9/5088 709/221 |
| 2011/0022694 | A1 | 1/2011 | Dalal et al. |
| 2011/0075667 | A1 | 3/2011 | Li et al. |
| 2011/0078303 | A1 | 3/2011 | Li et al. |
| 2012/0030335 | A1* | 2/2012 | Machida ............ G06F 11/1438 709/223 |
| 2012/0099602 | A1 | 4/2012 | Nagapudi et al. |
| 2013/0007216 | A1 | 1/2013 | Fries et al. |
| 2013/0031544 | A1 | 1/2013 | Sridharan et al. |
| 2013/0198319 | A1 | 8/2013 | Shen et al. |
| 2014/0032767 | A1 | 1/2014 | Nelson |
| 2014/0040888 | A1 | 2/2014 | Bookman et al. |
| 2014/0040892 | A1 | 2/2014 | Baset et al. |
| 2014/0059539 | A1 | 2/2014 | Simonsen et al. |
| 2014/0115164 | A1 | 4/2014 | Kalyanaraman et al. |
| 2014/0115584 | A1 | 4/2014 | Mudigonda et al. |
| 2014/0208329 | A1 | 7/2014 | Abali et al. |
| 2014/0241173 | A1 | 8/2014 | Knight |
| 2016/0072713 | A1* | 3/2016 | Mhatre ............ H04L 67/1004 709/235 |
| 2016/0164797 | A1 | 6/2016 | Reque et al. |
| 2016/0210172 | A1 | 7/2016 | Ramachandra et al. |

OTHER PUBLICATIONS

Digital Ocean, "How to Migrate Load Balancers", Jun. 2023, https://docs.digitalocean.com/products/kubernetes/how-to/migrate-load-balancers/ (Year: 2023).*
U.S. Appl. No. 14/163,906, filed Jan. 25, 2014, Jean-Paul Bauer, et al.
U.S. Appl. No. 14/317,949, filed Jun. 27, 2014, Matthew Shawn Wilson, et al.
"awsdocumentation," Amazon Elastic Compute Cloud: Supported Platforms, 2014 Amazon Web Services, Inc., pp. 1-2.
"awsdocumentation," Amazon Elastic Compute Cloud: Migrating from EC2-Classic to a VPC, 2014 Amazon Web Services, Inc., pp. 1-5.
"Elastic Load Balancing-Developer Guide," API Version Jun. 1, 2012, Amazon Web Services, Inc., pp. 1-289.
"awsdocumentation," Amazon Elastic Compute Cloud: ClassicLink, 2014 Amazon Web Services, Inc., pp. 1-4.
"Auto Scaling-Getting Started Guide," API Version Jan. 1, 2011, Amazon Web Services, Inc., pp. 1-9.
"Auto Scaling-Developer Guide," API Version Jan. 1, 2011, Amazon Web Services, Inc., pp. 1-198.
Masahiro Satou, et al., "Server Side Networking for Cloud Data Centers", 2012 IEEE 1st International Conference on Cloud Networking (CLOUDNET), Nov. 28, 2012, pp. 17-22.
Kapil Bakshi, "Considerations for Software Defined Networking (SDN): Approaches and Use Cases", AEROSPACE Conference, 2013 IEEE, Mar. 2, 2013, pp. 1-9.
U.S. Appl. No. 15/179,739, filed Jun. 10, 2016, Eric W. Schultze.
U.S. Appl. No. 13/833,945, filed Mar. 15, 2013, Ian Roger Searte.
U.S. Appl. No. 15/728,277, filed Oct. 9, 2017, Kevin Christopher Miller.
U.S. Appl. No. 14/548,196, filed Nov. 19, 2014, Edward Max Schaefer.
U.S. Appl. No. 15/823,185, filed Nov. 27, 2017, Kevin Christopher Miller.
U.S. Appl. No. 14/736,165, filed Jun. 10, 2015, Calm Maccarthaigh.
U.S. Appl. No. 16/029,468, filed Jul. 6, 2018, Kyle Tailor Akers.
U.S. Appl. No. 14/853,646, filed Sep. 14, 2015, Po-Chun Chen.
U.S. Appl. No. 16/056,078, filed Aug. 6, 2018, Unknown.
U.S. Appl. No. 15/439,751, filed on Mihir Sadruddin Surani.
U.S. Appl. No. 15/632,258, filed on Benjamin David Strauss.
U.S. Appl. No. 15/435,138, filed Feb. 16, 2017, Daniel Todd Cohn.
U.S. Appl. No. 15/702,589, filed Sep. 12, 2017, Kevin Christopher Miller.
U.S. Appl. No. 14/822,704, filed Aug. 10, 2015, Daniel T. Cohn.
U.S. Appl. No. 14/853,608, filed Sep. 14, 2015, Eric Jason Brandwine.
U.S. Appl. No. 13/829,721, filed Mar. 14, 2013, Eric Jason Brandwine.
U.S. Appl. No. 15/382,403, filed Dec. 16, 2016, Daniel Todd Cohn.
U.S. Appl. No. 15/011,302, filed Jan. 29, 2016, Eric Jason Brandwine.
U.S. Appl. No. 15/996,371, filed Jun. 1, 2018, Eric Jason Brandwine.
U.S. Appl. No. 15/663,592, filed Jul. 28, 2017, Kevin Christopher Miller.
U.S. Appl. No. 14/067,756, filed Oct. 30, 2013, Daniel T. Cohn.
U.S. Appl. No. 15/061,851, filed Mar. 4, 2016, Eric Jason Brandwine.
U.S. Appl. No. 15/154,818, filed May 13, 2016, Eric Jason Brandwine.

* cited by examiner

Initial state (pre-migration)

Migration phase 1

Migration phase 2

Migration phase 3

Migration phase 4

Migration phase 5

Migration phase 6

Migration phase 7

Migration phase 8

Migration complete

AUTOMATED MIGRATION OF COMPUTE INSTANCES TO ISOLATED VIRTUAL NETWORKS

This application is a continuation of U.S. patent application Ser. No. 14/658,965, filed Mar. 16, 2015, which is hereby incorporated by reference herein in its entirety.

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine. Each such virtual machine can be thought of as a software simulation acting as a distinct logical computing system that provides users with the illusion that they are the sole operators and administrators of a given hardware computing resource, while also providing application isolation among the various virtual machines.

Over time, a number of advanced features and capabilities have been added to the virtual computing services offered at some provider networks. For example, it may be possible for a client to select different types of backing storage devices (e.g., local versus off-host storage), desired levels of network isolation (e.g., some compute instances may be configured within isolated virtual networks whose internal networking configuration can be controlled largely by the client), various levels of security, different types of pre-configured software stacks, and so on. In addition, new generations of computing, storage and networking hardware have been employed. To simplify deployment of the new features and to help isolate the impact of bugs of various kinds, the resources of at least some provider networks have been divided into several logical partitions, with the newer features and capabilities being restricted to some subset of the partitions while the older technologies continue to be supported in another subset of the partitions. For example, isolated virtual networks may only be supported in some logical partitions, with accesses from other logical partitions disabled by default. Customers of the virtual computing services may sometimes wish to transfer applications from one logical partition (e.g., an older partition in which the applications were initially deployed due to historical reasons) to another logical partition (where for example a richer set of features may be supported). However, accomplishing such transitions without affecting application availability may not be straightforward in some provider network environments.

Figure 1:
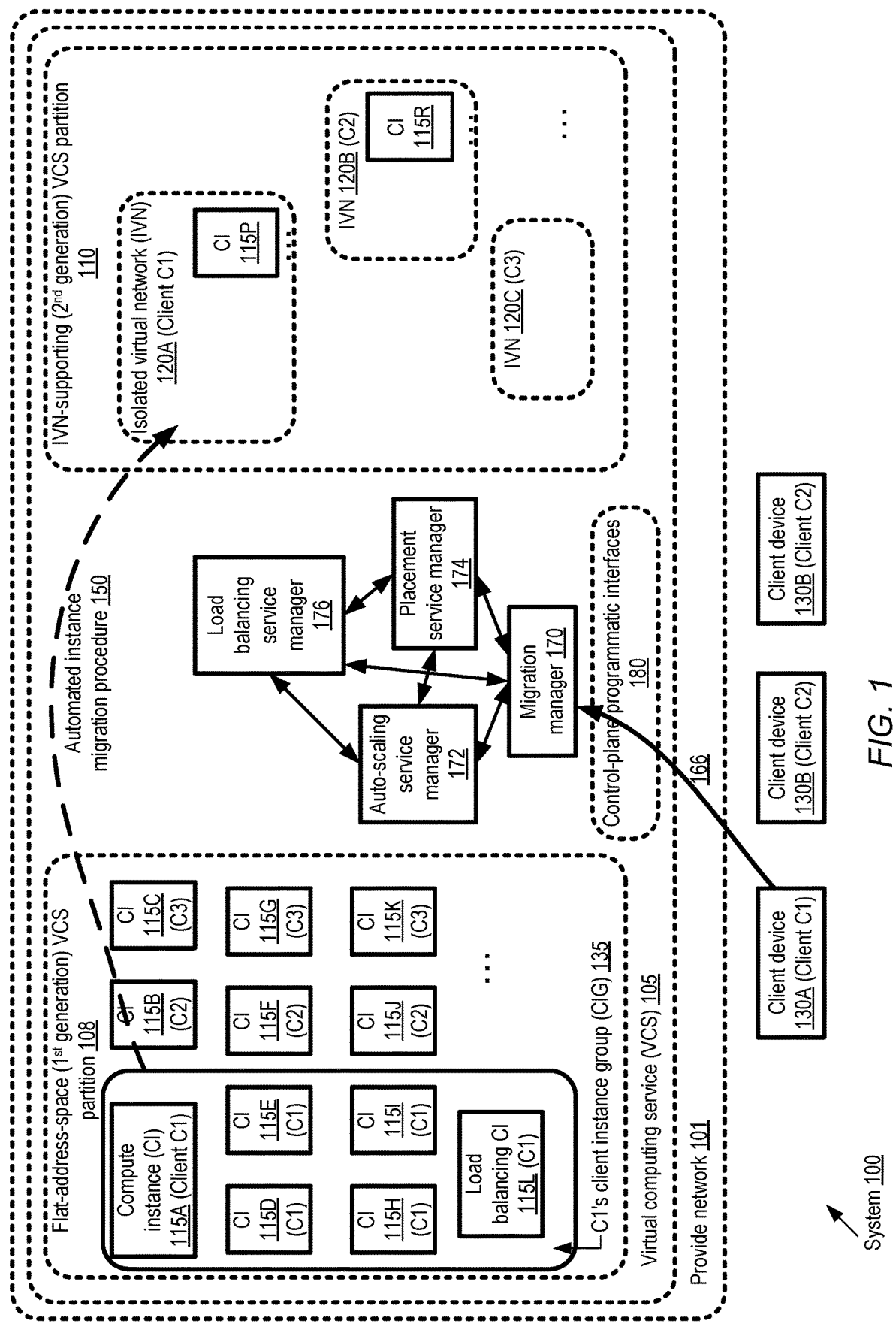
FIG. 1 illustrates an example system environment in which automated migration of groups of compute instances across logical partitions of a provider network may be supported, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Various embodiments of methods and apparatus for automated migration of compute instances to isolated virtual networks (IVN) of a provider network's virtual computing service are described. Networks set up by an entity such as a company or a public sector organization to provide one or more services (such as various types of multi-tenant and/or single-tenant cloud-based computing or storage services) accessible via the Internet and/or other networks to a distributed set of clients or customers may be termed provider networks in this document. Some provider networks may also be referred to as "public cloud" environments. The term "multi-tenant service" may be used herein to refer to a service that is designed to implement application and/or data virtualization in such a manner that different client entities are provided respective customizable, isolated views of the service, such that one client to whom portions of the service functionality are being provided using a given set of underlying resources may not be aware that the set of resources is also being used for other clients. For example, a multi-tenant virtualized computing service (VCS) may instantiate several different guest virtual machines on behalf of respective clients at a given hardware server, without any of the clients being informed that the hardware server is being shared with other clients. Guest virtual machines may also be referred to as "compute instances" or simply as "instances" herein, and the hardware servers on which one or more instances are resident may be referred to as "virtualization hosts" or "instance hosts". Clients may run any desired collection of applications on the compute instances set up on their behalf in various embodiments, such as various web-services based applications, databases, and the like. A provider network may typically include several large data centers hosting various resource pools, such as collections of physical and/or virtualized computer servers, storage devices, networking equipment, security-related equipment and the like, needed to implement, configure and distribute the infrastructure and services offered by the provider.

Some VCSs may have been initially set up to provide a relatively small core set of features, such as the ability for clients to request allocation of instances with performance characteristics corresponding to a selected "instance type". Examples of such instance types may include "small", "medium" or "large" instances, each of which may be configured with different combinations of CPUs, memory, networking and/or storage. Each of the instances may be assigned a "public" network address (e.g., an IP (Internet Protocol) address accessible from outside the provider network, such as from a client's premises) and a "private" network address (an IP address accessible from within the provider network) in some embodiments. Components of a virtualization management software stack (such as a hypervisor or an administrative domain operating system) of the virtualization hosts may be responsible for handling interactions between the compute instances and the hardware components of the virtualization hosts, including for example the hardware network interface cards (NICs) over which the traffic of the different compute instances of the host has to flow. A relatively simple flat network address space management mechanism may have been used in some embodiments in the initial implementation of a VCS, in which all the compute instances of the VCS are assigned addresses from within a common address space.

Over time, additional features may be added to the core capabilities of a VCS. For example, in at least some embodiments, the VCS network may be partitioned into a plurality of logical partitions, with more sophisticated network isolation techniques being used for some partitions than for others. Such isolation techniques may be implemented, for example, in response to client needs for greater networking configuration autonomy and greater security. In one logical partition of the VCS, for example, clients may be able to request the establishment of isolated virtual networks (IVNs), with each IVN comprising some set of virtual and/or physical resources allocated to the client and provided protection from accesses originating outside the IVN. A client may be granted substantial networking configuration flexibility for the IVN. For example, clients may assign IP addresses of their choice with the isolated virtual network (without being concerned with the possibility of conflicts with IP addresses assigned in other IVNs), set up subnets and routes, and so on, in a manner very similar to the way that network configuration settings could be selected at a customer-owned facility. In order to support secure connectivity between the compute instances of a particular IVN and a client network outside the provider network, various techniques may be supported in different embodiments, such as the use of VPN (virtual private network) connections and/or the use of dedicated direct physical links between client-owned routers and provider network-owned routers. Numerous layers of intermediary networking devices and associated metadata may have to be set up to support IVNs in at least some embodiments. The logical partition in which IVNs are supported may be referred to as a "second-generation" or "IVN-supporting" logical partition. Meanwhile, in at least some embodiments the provider network operator may continue to support the original core feature set in another logical partition of the provider network, which may be deemed the "classic" or "first-generation" logical partition. In the first-generation logical partition, the technique described above in which all instances are treated as belonging to a shared networking address space may continue to be used, and IVNs may not be permitted. In at least some embodiments, as a default, network traffic flow may not be permitted across the boundaries of the logical partitions.

A number of VCS capabilities may be supported in both the first-generation and the second-generation partitions in some embodiments. For example, a virtualized load balancing mechanism may be implemented in one embodiment to distribute application requests across a set of compute instances, with the load balancer itself being implemented as a compute instance in some cases. In at least some embodiments, an auto-scaling service may be implanted at a VCS, to enable the number of compute instances assigned to handle an application to be scaled up (or down) automatically in accordance with client-specified rules or triggers (e.g., rules that define the workload conditions that should result in the launching of new instances or the disabling of existing instances). Although such advanced capabilities may be available separately for instances launched in either the first-generation or the second-generation partitions in some embodiments, the default security settings for IVNs may prevent communication between the instances in an IVN and instances running in the first-generation partition. While many clients may have continued to utilize the first-generation partition for long-running applications (which may have been deployed before the second-generation partition became available), the new features implemented in the second-generation partition may become more and more appealing to such clients.

According to at least one embodiment, a migration service may be implemented to enable client applications to be transferred from one logical partition to another in as transparent a manner as possible (e.g., with zero down time for as many applications as is feasible, and minimal down time for the remaining applications). In some embodiments, the migration service may comprise one or more administrative or control plane components collectively referred to herein as a "migration manager". As described below, the migration manager may leverage various existing services and features of the VCS in some embodiments, such as portions of the virtualized load balancing service and the auto-scaling service mentioned above.

In some embodiments, the migration manager may determine that a compute instance group comprising one or more compute instances allocated to a particular client (on which the applications of the client are executed) are to be migrated from a first logical partition of the VCS (e.g., the first generation partition) to a particular IVN established at a second logical partition on behalf of the client. In some embodiments, the migration manager may implement a set of programmatic interfaces (e.g., a web-based console, a set of application programming interfaces (APIs), a command-line tool, an installable graphical user interface or the like) to enable clients to "opt-in" to automated migration of at least some of their instances across partition boundaries. The collection of compute instances to be migrated for a particular client may be referred to herein as a client instance group (CIG) or a source group, and the particular IVN into which the CIG instances are migrated may be referred to as the "destination IVN" herein. The first logical partition, from which the CIG is migrated, may be referred to as the "source" logical partition of the migration, and the logical partition in which the destination IVN is configured may be referred to as the "destination" logical partition. In at least one embodiment, a client may use the migration manager's programmatic interfaces to indicate that the migration manager may select (and if necessary, establish) the destination IVN for a CIG. For example, if the client opts in for automated migration of their CIG but does not yet have an appropriate IVN configured, the migration manager may initiate the configuration of a new IVN to be used as the destination IVN.

The instances of a given CIG may be broadly classified into two subsets in some embodiments: a first subset comprising one or more instances that are members of an auto-scaling group, and a second subset comprising one or more standalone instances that are not part of an auto-scaling group. Clients may configure compute instances as members of an auto-scaling group (ASG) based at least in part on the kinds of applications being run on the instances in various embodiments. For example, instances being used primarily for stateless applications (such as some types of web applications), which can be scaled up relatively easily by adding additional application processes or threads, may be well suited for auto-scaling. In contrast, more stateful applications, in which for example substantial amount of persistent application state information has to be synchronized or shared among different application processes or threads, may be considered less appropriate for auto-scaling. Clients may programmatically define various triggers or rules to be used to add or remove compute instances to their auto-scaling groups in some embodiments, as described below in further detail. A given client may establish numerous auto-scaling groups in some embodiments for respective applications or respective sets of applications, with each ASG configured to add or remove instances based on a respective set of triggers or rules. In many implementations, at least one front-end virtual load balancer may be configured for each ASG. The virtual load balancer may be implemented at its own compute instance in some such implementations (i.e., at a compute instance other than the ones being used for the application set for which automatic scaling is desired). In at least some implementations, metadata in the form of one or more instance launch configurations (also described below in further detail) may be stored for each ASG. The instance launch configurations may, for example, identify (or include a copy of) a virtual machine image which can be used to instantiate a new instance of the ASG, as well as an indication of the instance type (e.g., "small", "medium" or "large"), instance-security-related entries and other metadata entries which collectively enable the auto-scaling service to rapidly add new instances to the ASG if and when the relevant triggering conditions are met.

In some embodiments, the migration manager may take a different approach to orchestrating the migration of those CIG instances which belong to an ASG, than is taken for the standalone instances which do not belong to any ASG. For the first subset of instances (which may be referred to as "ASG instances" herein due to their membership in an ASG), a rapid migration procedure may be implemented using extensions of the core auto-scaling service capabilities, such that the applications running on the instances experience zero (or close to zero) down time. In at least one embodiment, some of the standalone instances may implement and/or be managed by other provider network services (such as various database-related services) which provide support for quick instance failovers, and such failover capabilities may be utilized or triggered by the migration manager to migrate such instances. In some embodiments, live migration (i.e., another form of migration with negligible or zero down-time, performed without using auto-scaling capabilities) across logical partition boundaries may be supported for some types of instances, and if the CIG's standalone instances include such instances, live migration may be used for them. For the remaining standalone instances, a somewhat longer migration procedure may be implemented in various embodiments, in which the original standalone instances may be re-booted (which may result in a short down-time). This latter technique may be referred to herein as "reboot migration". In at least one such embodiment, reboot migration may serve as the last resort with respect to CIG migration, used only when faster mechanisms or mechanisms with shorter down-times are not available for a standalone instance.

As described below in further detail, during at least some phases of the migration procedure used for the ASG instances in various embodiments, a cross-partition logical channel (CLC) may be used to provide connectivity between the newly created instances in the destination IVN, and one or more resources of the CIG that remain (at least temporarily) in their original logical partition. In one embodiment, the migration manager may initiate one or more configuration changes to establish the CLC. For example, one or more networking and/or security settings of the destination IVN may be modified to allow CLCs to be set up for the destination IVN. In addition, in at least some embodiments, configuration settings associated with the resources in the source logical partition to which communication from within the destination IVN are to be permitted may have to be changed—e.g., the resources may have to be added to a security group defined for the destination IVN.

After identifying the ASG instances of the CIG, which may include a load balancing compute instance and one or more application-implementing compute instances, the migration manager may trigger the establishment of an equivalence group of instances in the destination IVN in some embodiments. The equivalence group may comprise respective replacement instances corresponding to each of the ASG instances which are not being used as a load balancer in at least one embodiment. Thus, for example, if the ASG of the CIG includes one load-balancing compute instance LBCI1 and four application-implementing instances AppCI1, AppCI2, AppCI3 and AppCI4, the equivalence group may comprise four replacement instances ReplCI1, ReplCI2, ReplCI3, and ReplCI4. The configurations of each of the replacement instances may be based at least in part on the configurations of the corresponding ASG instances in various embodiments—e.g., the same type of instance ("small", "medium" or "large") may be set up, the same network addresses may be assigned, and so on. Generally speaking, as implied by the name "replacement" instances, a newly established instance in the destination IVN may be configured to be capable of handling at least the same level of application workload as the corresponding instance in the source logical partition. The migration manager may send a request to (or generate an event which is monitored by) a control plane component of the auto-scaling service to initiate the establishment of the equivalence group in some embodiments. In at least one embodiment, a location-aware placement manager of the VCS may be responsible for selecting the appropriate virtualization hosts for the replacement instances—e.g., for ensuring that the virtualization hosts selected have sufficient unused computational capacity to accommodate the instances, that the virtualization hosts are capable of providing a desired level of application availability and failure resilience, and so on. Connectivity between the equivalence group instances and the load balancing instance (e.g., LBCI1 in the above example), which remains within the source logical partition at this stage of the migration procedure, may be enabled by the migration manager using a CLC in some embodiments. In addition, in at least some embodiments, connectivity between the equivalence group and one or more standalone instances of the CIG may also be enabled using a CLC (either the same CLC as is being used for the load balancer, or one or more additional CLCs) at this stage.

After the connectivity between the equivalence group instances and at least the load balancing CI in the source logical partition is established, in at least some embodiments the migration manager may initiate the disabling or shutdown of the application-implementing instances of the ASG within the source logical partition. Application requests, which were earlier being distributed by the load balancing instance among the other instances of the ASG in the source logical partition, may subsequently be distributed among the instances of the equivalence group via a CLC, thus avoiding any down time from the application perspective. In some implementations, depending on the kind of application being implemented, responses to the application requests may be transmitted back to the requesting entities via the CLC and the load balancing CI.

In some embodiments, a replacement load balancer (e.g., implemented using an additional compute instance) may be instantiated in the destination IVN at this stage of the migration. As in the case of the equivalence group, the establishment of the replacement load balancer may also be initiated in at least one embodiment in the form of a request or triggering event generated by the migration manager and directed to the auto-scaling service control plane. In turn, in some embodiments the auto-scaling service control plane may utilize the services of a load balancing service of the VCS, e.g., to ensure that the replacement load balancer has the appropriate and performance characteristics. In one embodiment, for example, a public IP address matching that of the original load balancer in the source logical partition may be assigned to the replacement load balancer. The migration manager may also initiate the appropriate configuration operations to enable connectivity between the replacement load balancer and the instances of the equivalence group in various embodiments—e.g., network addresses of the equivalence group instances may be added to a workload-sharing server list of the replacement load balancer. After the replacement load balancer has been configured, in at least some embodiments, the original load balancer may be shut down or disabled, e.g., in response to a request or command initiated by the migration manager. At this stage, the subset of the CIG instances that were part of the ASG may be considered fully migrated to the destination IVN. If the client on whose behalf the migration is being implemented had requested that instances of more than one ASG be migrated, the steps of establishing equivalence groups and replacement load balancers may be repeated for each such ASG in some embodiments. After the ASG migrations are completed, in at least some scenarios one or more standalone instances may remain in the source logical partition, and may continue to communicate with the equivalence group (and/or the new load balancing instance) via a CLC.

In the next stage of the migration of the CIG, in various embodiments the migration manager may initiate one of the other migration approaches—e.g., service-managed failover, live migration, or reboot migration procedure for each of the standalone instances that remain in the source logical partition (if the CIG included standalone instances). In one implementation, for example, the reboot migration may include generating a virtual machine image corresponding to a standalone instance, transmitting the virtual machine image to a destination virtualization host usable for the destination IVN, copying contents of one or more storage devices associated with the standalone instance (e.g., a locally-attached disk or volume) to corresponding storage devices at the destination virtualization host, shutting down the standalone instance and launching a new instance at the destination virtualization host using the machine image and the copied storage device contents. After the new instance is launched on the destination virtualization host, the equivalence group instances may communicate with it directly instead of having to use the CLC. The CLC may therefore be disabled in at least some embodiments. The configuration changes that were applied to the destination IVN to enable cross-partition communication may be reversed in one implementation to complete the migration procedure.

Example System Environment

FIG. 1 illustrates an example system environment in which automated migration of groups of compute instances across logical partitions of a provider network may be supported, according to at least some embodiments. As shown, system 100 comprises a provider network 101 within which a virtual computing service (VCS) 105 may be implemented. The resources of the VCS 105 may be divided into a plurality of logical partitions with respective networking address space management mechanisms in the depicted embodiment. For example, logical partition 108 may use a flat network address space mechanism, in which isolated virtual networks (IVNs) are not supported, and all the compute instances set up on behalf of various clients are assigned addresses from a common or shared address space. In contrast, logical partition 110 may comprise a plurality of IVNs set up on behalf of various clients, such as IVNs 120A, 120B and 120C in the depicted embodiment. As mentioned earlier, each IVN may include a set of virtual and/or physical resources allocated to a VCS client, configured in such a way that accesses from entities outside the IVN may be prevented (at least by default, until the appropriate IVN configuration settings are changed). A client may be granted substantial networking configuration flexibility within an IVN in the embodiment shown in FIG. 1. For example, clients may assign private IP addresses of their choice with the IVN (without being concerned with the possibility of conflicts with private IP addresses assigned in other IVNs), set up subnets and routes, and so on, in a manner very similar to the way that network configuration settings could be selected at a customer-owned facility. In some provider networks, a VCS logical partition 110 which supports IVNs may be referred to as a second-generation IVN, e.g., in contrast to logical partitions such as 108 which may support fewer features and may therefore be referred to as first-generation partitions. In the embodiment depicted in FIG. 1, by default, at least data-plane network traffic (i.e., traffic associated with client applications) may not be permitted to flow from logical partition 108 to logical partition 110 or from logical partition 110 to logical partition 108.

Each logical partition in the depicted embodiment may include, among other resources, respective sets of compute instances (CIs). Each compute instance may be implemented, for example, as a guest virtual machine on a virtualization host of the VCS. (Virtualization hosts, which may also be referred to as instance hosts, are not shown in FIG. 1 to avoid clutter.) At least some virtualization hosts may be used in multi-tenant mode in the depicted embodiment, so that for example, CIs allocated to more than one client of the VCS may be instantiated on the same virtualization host. Other virtualization hosts may be used for one or more instances allocated to a single client, and may therefore be referred to as single-tenant hosts. In addition to one or more guest virtual machines or compute instances, a virtualization host may also include a virtualization management software stack in various embodiments, including for example a hypervisor and/or an administrative domain or "privileged" virtual machine. The virtualization management software stack may act as an intermediary between the compute instances and hardware devices, including the NICs of the virtualization hosts which may be used for inbound and outbound traffic of the CIs. As shown, each CI 115 may be launched or instantiated on behalf of a client of the VCS in the depicted embodiment—e.g., instances 115A, 115D, 115E, 115H, 115I and 115L in logical partition 108 (as well as instance 115P in IVN 120A in logical partition 110) are launched on behalf of a client C1. Similarly, instances 115B, 115F, 115I and 115R are allocated to client C2, while instances 115C, 115G and 115K are instantiated on behalf of client C3. Communications between the provider network resources of a given client, and client devices outside the provider network (such as client devices 130A, 130B and 130C) may be enabled using a variety of mechanisms and pathways in various embodiments, including for example virtual private network connections, dedicated physical links (also known as "direct connect" links), connections over portions of the public Internet, and so on.

Each of the IVNs 120 shown in logical partition 110 of FIG. 1 may be established on behalf of a particular client in the depicted embodiment. For example, IVN 120A is set up for client C1, IVN 120B for client C2, and IVN 120C is set up for client C3. In at least some embodiments, a particular client (such as C1) may wish to transfer the applications running at a group of instances (such as client instance group or CIG 135) of the first-generation logical partition 108 to an IVN. The client may, for example, wish to increase the network isolation level of the applications, or take advantage of other features which are supported in the second-generation logical partition 110 but not in the first-generation logical partition 108. In at least some embodiments, newer versions of computing, storage and/or networking hardware and/or associated software may be available in the second-generation logical partition 110 than in first-generation partition 108, and this may motivate the client to request the migration of their instance group. In some implementations, it may be in the interest of the provider network operator to move away from an older generation of technology to a newer generation, and the clients of the VCS may be incentivized in various ways to migrate their instances to the second-generation partition 110.

A migration manager 170 of the VCS control plane may implement one or more programmatic interfaces 180 (e.g., a web-based console, APIs, command-line tools, GUIs or the like) to enable clients to submit migration-related requests and/or preferences in the depicted embodiment. In response to an indication 166 of a client instance group such as 135 which is to be migrated to the IVN-supporting partition 110, the migration manager may initiate a multi-phase automated migration procedure 150. As a result of the migration procedure 150, applications which were running on instances of a CIG in one logical partition of the VCS may be transferred to instances running in a destination IVN (e.g., IVN 120A in the case of CIG 135). Details of an example migration procedure which may be used in some embodiments are illustrated in FIG. 3a-FIG. 3j and described below.

An auto-scaling service may be implemented at the VCS in the embodiment shown in FIG. 1. The auto-scaling service (whose control plane may include auto-scaling service manager 172, for example) may enable clients to request the establishment of "auto-scaling groups" (ASGs) of CIs configured to implement related sets of applications. The auto-scaling service may be responsible for, among other functions, adjusting the number of members of an ASG (by launching new instances or shutting down existing instances) in response to various types of triggering events in some embodiments. In at least some embodiments, the instances of a CIG to be migrated may be classified into two subsets by the migration manager 170—one subset of instances that belong to an ASG, and the remaining standalone instances which do not belong to an auto-scaling group. An equivalence group of instances capable of taking over the application processing for those CIG instances which belong to an ASG may be launched rapidly in a destination IVN such as 120A (e.g., using metadata such as launch configuration settings that have already been stored for auto-scaling purposes) by or in response to a request from the migration manager 170. During certain phases of the migration procedure, the migration manager 170 may initiate or make the appropriate networking and security-related configuration changes to ensure that application requests continue to be forwarded (e.g., by a load balancer associated with the ASG, such as load balancing CI 115L of CIG 135) to the instances in the destination IVN where they can be processed. As a result, zero (or very close to zero) down time may be experienced by the users of the applications which were running on the instances that belonged to an ASG prior to the migration. After replacement instances and/or load balancers have been rapidly configured in the destination IVN, the corresponding resources in the source logical partition may be shut down in various embodiments. In at least some embodiments, as mentioned earlier, several different approaches may be taken with regard to migrating standalone CIs (CIs which are not part of an ASG). For example, some CIs may be managed at least in part by failover-capable services such as various types of database services implemented at the provider network. The migration manager may trigger or invoke the failover capabilities (or extensions of the core failover capabilities) of the services to migrate such instances in various embodiments. Other non-ASG instances may be configured to support a live migration procedure in which a replacement instance can be started up at a different host with zero or near-zero down time without using ASG features, while the migration of a third category of non-ASG instances may require reboots and non-zero down times. For example, during reboot migration, a few minutes may be needed to copy state information of an application running in a standalone instance to a storage device of the replacement instance, and processing of new application requests may have to be suspended during such time periods in at least some embodiments.

Figure 2:
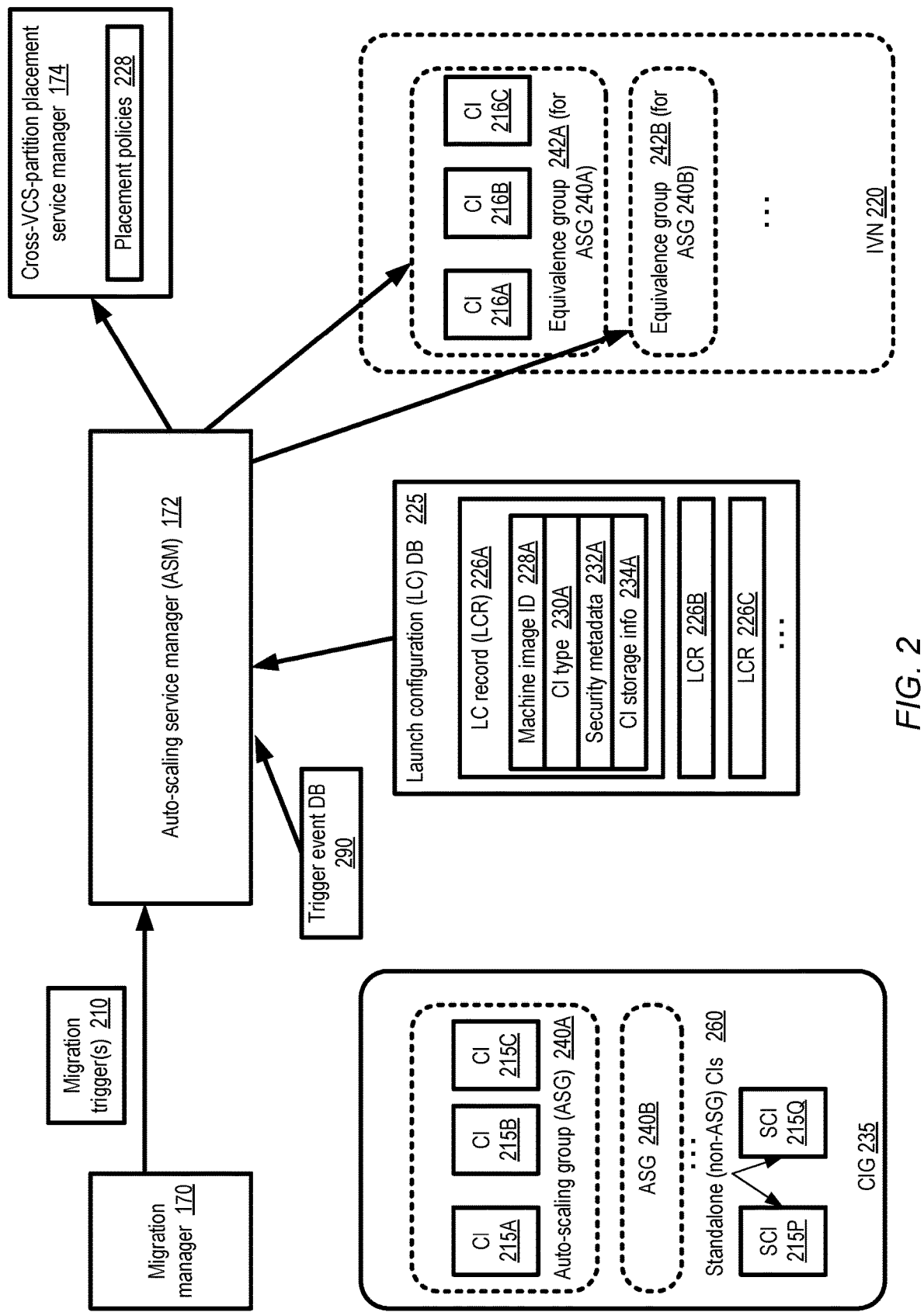
FIG. 2 illustrates examples of operations that may be triggered by a migration manager to implement zero-downtime migration of at least some compute instances, according to at least some embodiments.

In at least some embodiments, the migration manager 170 may utilize various functions supported by other components of the VCS. In the depicted embodiment, for example, the VCS may include auto-scaling service manager 172, a load balancing service manager 176 (responsible for configuring virtualized load balancers for distributing application requests among groups of CIs), and a placement service manager 174 (responsible for selecting virtualization hosts on which compute instances are to be launched). The migration manager 170 may interact directly or via intermediaries with one or more of the auto-scaling manager, the load balancing service manager, and/or the placement service manager in the depicted embodiment to implement the migration procedure. For example, as indicated in FIG. 2 and described below in further detail, in at least some embodiments the migration manager may generate triggering events or requests that cause the auto-scaling service manager to instantiate replacement instances within a destination IVN and/or shut down the original instances of the IVN after the replacement instances have come on line. In one embodiment, in order to migrate some types of standalone instances using an approach based on automated failover, the migration manager may interact with control-plane components of other services such as a failover-supporting database service. In at least one embodiment, the migration manager may not necessarily communicate or collaborate with other control-plane entities such as the auto-scaling service manager; instead, for example, the necessary configuration changes, instance launches, instance shutdowns etc. may be handled by the migration manager itself. In at least some embodiments, the migration manager may comprise a plurality of software and/or hardware components which may be distributed among one or more data centers of the provider network. Other components of the VCS, including the auto-scaling service manager, the load balancing service manager, and/or the placement service manager may also be implemented in a distributed manner in various embodiments.

Migration-Related Triggering of Auto-Scaling Triggers

FIG. 2 illustrates examples of operations that may be triggered by a migration manager to implement zero-downtime migration of at least some compute instances, according to at least some embodiments. In the depicted embodiment, the migration manager 170 is responsible for orchestrating the migration of a client instance group 235 to an IVN 220. CIG 235 includes a plurality of ASGs, including ASG 240A and 240B, as well as a set of standalone instances 260 such as SCI 215P and 215Q. Each ASG 240 may include some number of compute instances, such as CIs 215A, 215B and 215C of ASG 240A. For each ASG 240, auto-scaling service manager (ASM) 172 may store one or more launch configuration records (LCRs) 226 (e.g., 226A, 226B and 226C) in a launch configuration database 225 in the depicted embodiment.

The LCRs may include several types of metadata which can be used to rapidly instantiate new member instances of the corresponding ASG, and/or to instantiate equivalence group instances for migration purposes in at least some embodiments. For example, LCR 226A, which may correspond to a particular ASG such as 240A may include a virtual machine identifier 228A, a compute instance type indicator 230A, a set of security metadata 232A, and CI storage information 234A. The VM identifier 228A may be used to quickly instantiate a new CI with similar characteristics as an existing member of the corresponding ASG. The compute instance type 230A may indicate whether the corresponding instance of the ASG is a "small", "medium" or "large" instance, for example, so that a virtualization host with the appropriate available capacity can be selected for a replacement or scaled-up instance. The instance type field 230 may indicate any of a supported set of instance types of the VCS in various embodiments. Security metadata 232A may include, for example, a security group and/or a key pair. A security group may act as a virtual firewall that controls inbound and outbound traffic permissions in some embodiments (e.g., the network address ranges, protocols and ports permitted for incoming and outgoing packets may be specified within rules of a security group). A key pair may be used to encrypt and decrypt login information and/or other communications with an instance, e.g., using any of various public key cryptography protocols. The CI storage information 234A may indicate, for example, the type of storage device used for the instance's root file system and/or other file systems (such as, for example, a local storage devices at the virtualization host, or a network-attached logical volume managed by a storage service of the provider network). In at least some embodiments, the CIs included in a given ASG 240 may differ from one another in various characteristics (such as instance type, or whether the instance is being used as a load balancer or not), and several LCRs corresponding to the different instances may be stored for a given ASG in such scenarios.

In addition to the LC database 225, the ASM 172 may also have access to a trigger event database 290 in the depicted embodiment. The entries in trigger event database may indicate, for each ASG managed by the ASM, the particular conditions or events that lead to the instantiation of additional instances for the ASG, or to the disablement of existing instances of the ASG. For example, the ASM may be configured to add an instance to an ASG if the workload level (as measured by a VCS monitoring subsystem keeping track of incoming application requests) for the ASG increases by 20% over some time period, and to shut down one of the ASG instances if the workload level decreases by 25%. At least some of the trigger events may be associated with changing workload levels for an ASG in the depicted embodiment, while other trigger events may be associated with migration.

In some embodiment, the migration manager 170 may generate one or more migration trigger(s) 210, e.g., in response to determining that a CIG such as CIG 235 is to be migrated to a different logical partition of the VCS. In at least one implementation, the migration manager may invoke an API implemented by the ASM to generate a migration trigger. A migration trigger may include, for example, an indication of one or more ASGs 240 of the CIG, as well as an indication of the destination IVN 220 to which the instances of the ASGs are to be migrated.

In response to a detection or receipt of a migration trigger from the migration manager, the ASM may instantiate a respective equivalence group 242 in the destination IVN 220 in the depicted embodiment. Using the LCRs 226 corresponding to the ASG to be migrated, the ASM may rapidly launch the same number of instances in the equivalence group as were present in the ASG prior to the transmission of the migration trigger. For example, in equivalence group 242A, instances 216A, 216B and 216C may be started, corresponding to instances 215A, 215B and 215C of ASG 240A. The particular instance hosts at which the equivalence group CIs 216 are launched may be selected in some embodiments by a cross-VCS-partition placement manager 174 in accordance with a set of placement policies 228. The placement policies may, for example, govern how instance hosts should be distributed across availability containers of the provider network, the minimum spare performance capacity that the instance hosts selected should have, and so on. Each of the instances in the equivalence group may be configured to match the corresponding instance of the source ASG 240A—e.g., the same instance type may be selected, the same network addresses may be assigned, the same file systems may be set up, and so on. Because much or all of the metadata necessary to launch the new instances of the equivalence group may already be available in the LCRs, in at least some embodiments the establishment of the new instances may take only a short time. Furthermore, at least in some embodiments, the applications that were running at the ASG instances prior to the migration may be stateless, and as a result application state information need not be copied to the new instances of the equivalence group. Similar equivalence groups may rapidly be set up for each of the ASGs of the CIG—e.g., equivalence group 242B may be configured for ASG 240B, and so on.

In the depicted embodiment, the migration manager 170 may initiate the required configuration changes to ensure that, while the migration procedure for the CIG as a whole is still incomplete, connectivity between the equivalence groups and the resources of the CIG that remain in the source logical partition is maintained. For example, the establishment of a cross-partition logical channel (CLC) between the destination IVN 220 and the standalone instances 215P and 215Q may be initiated by the migration manager. In at least some embodiments, as indicated in FIG. 3a-FIG. 3j, the migration manager may first trigger the instantiation of replacement instances for those CIs of an ASG which are not acting as load balancers, while retaining the load balancing CIs in the source partition, and then trigger the migration of the load balancing CIs in a separate step, using the same kinds of migration triggers as discussed above. After replacement instances for the ASG CIs are set up in the destination IVN 220, in some embodiments the migration manager may direct additional migration triggers to the ASM to terminate the corresponding CIs in the source logical partition. In other embodiments, a single migration trigger may result in both the instantiation of replacement CIs in the destination IVN and the subsequent termination of the original CIs in the source partition. In at least some embodiments, the migration manager may initiate one or more of the other migration mechanisms available—e.g., migration employing failover-capable services such as database services, live migration, or reboot migration—for the standalone instance such as SCIs 215P and 215Q after the ASG instances of the CIG have been migrated successfully.

Multi-Phase Migration Procedure

Figure 3A:
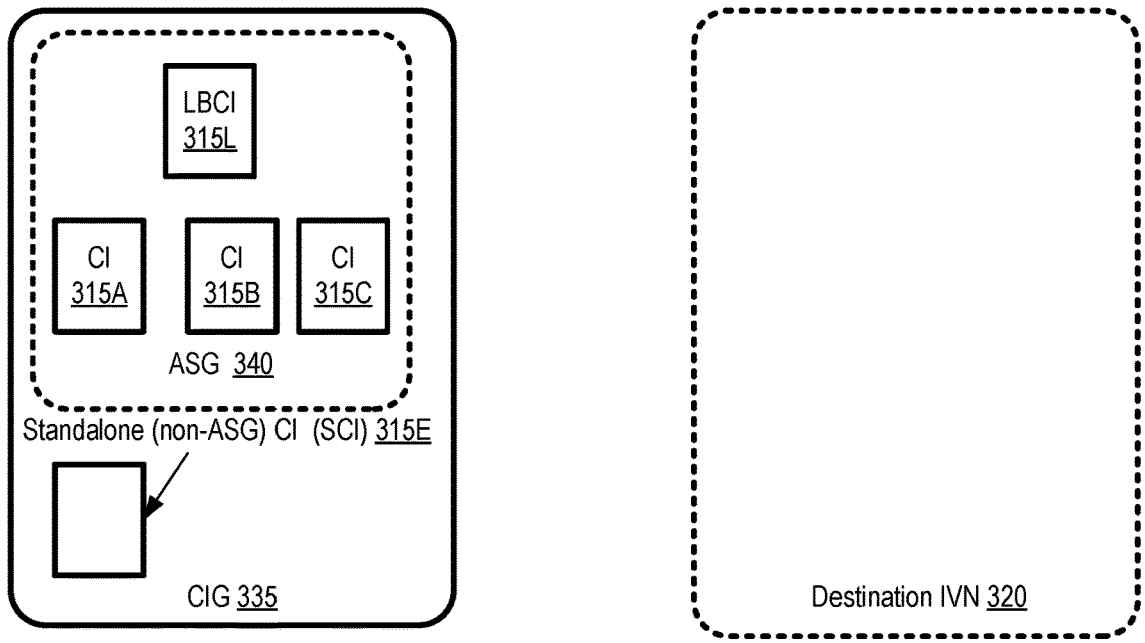
FIG. 3a-FIG. 3j collectively illustrate example phases of an automated migration procedure that may be implemented for compute instances, according to at least some embodiments.

FIG. 3a-FIG. 3j collectively illustrate example phases of an automated migration procedure that may be implemented for compute instances, according to at least some embodiments. FIG. 3a shows a pre-migration state of the instances of a client instance group 315 belonging to a first logical partition of a VCS, within which isolated virtual networks may not be permitted. The instances of the CIG 315 are to be migrated to a destination IVN 320, configured within a second logical partition of the VCS. To simplify the example, CIG 315 includes just one ASG 340 and just one standalone CI 315E; in general, any number of ASGs (including zero) and any number of SCIs (including zero) may be included in a CIG. Furthermore, to simplify the presentation, standalone CI 315E is assumed to require reboot migration in the illustrated example—that is, neither live migration nor failover-based migration is assumed to be supported for CI 315E. ASG 340 includes a load balancing CI (LBCI 315L) configured as a front end device responsible for distributing application requests among other CIs 315A, 315B and 315C of the ASG. The destination IVN 320 is shown with no CIs present prior to the migration, although in general any number of CIs may exist in a destination IVN at the time that the migration procedure is initiated.

Figure 3B:
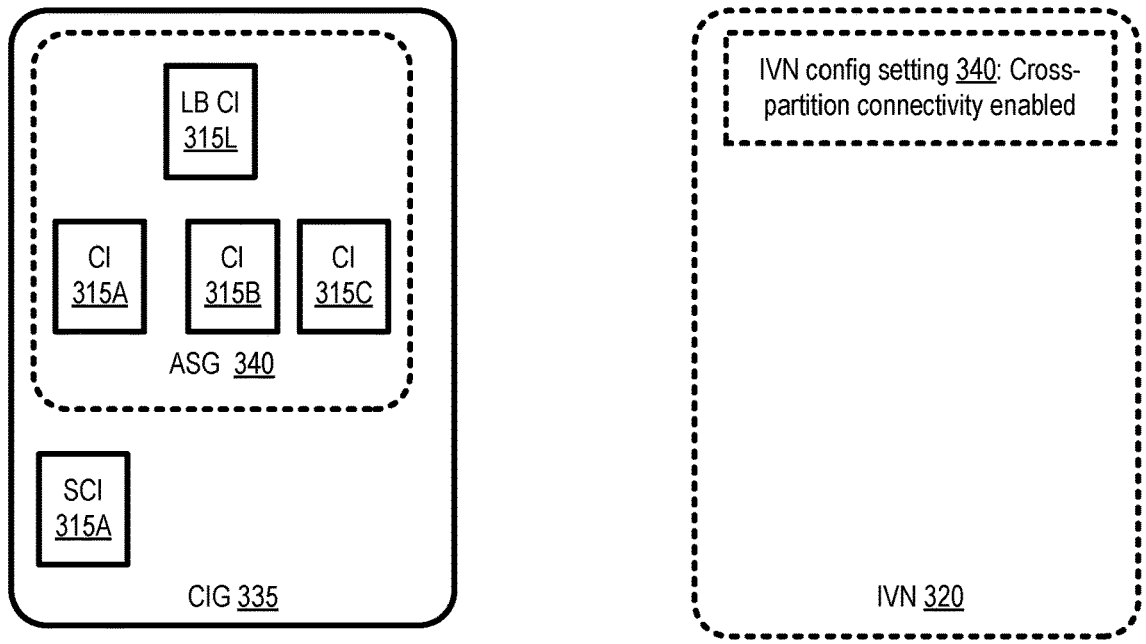
Figure 3C:
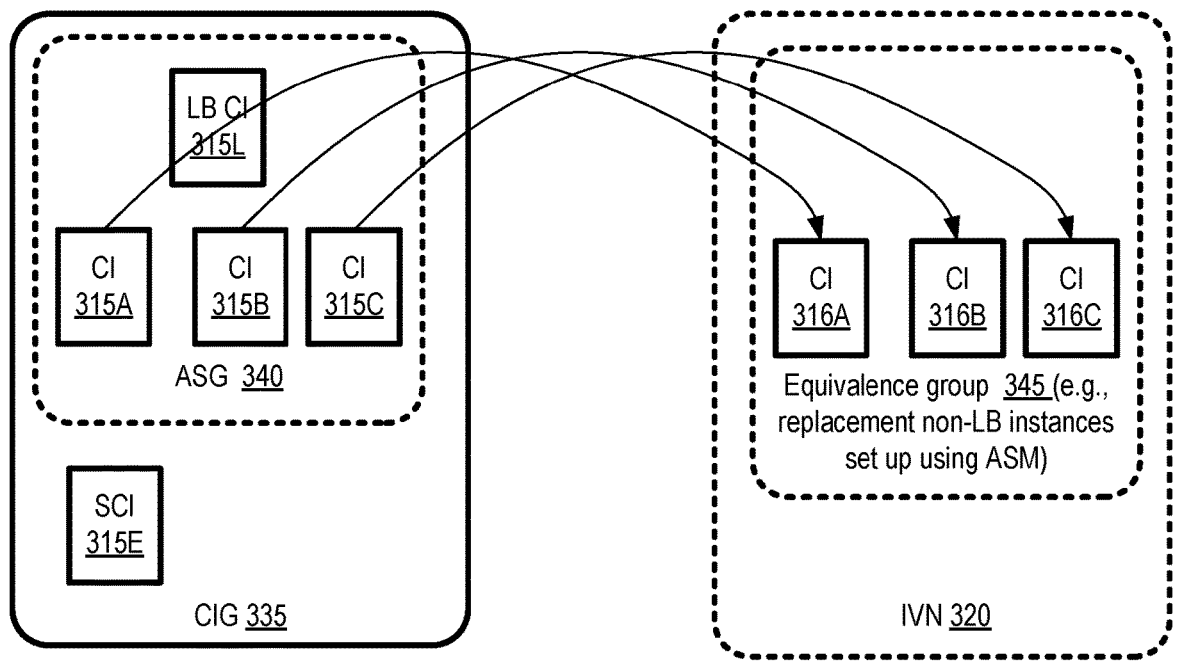

As shown in FIG. 3b, a configuration setting 340 of the destination IVN may be modified in the depicted embodiment in a first phase of the migration procedure, e.g., by the migration manager, to permit the establishment of cross-partition logical channels (CLCs) to be configured at the destination IVN. In some embodiments, the VCS may implement a programmatic interface such as an API to enable cross-partition connectivity for a specified IVN (e.g., with the IVN being indicated by an API parameter), and the migration manager may invoke such an interface. One or more additional operations may be performed later in the migration procedure to establish a CLC in the depicted embodiment; the configuration change 340 of FIG. 3a may be considered a pre-requisite for establishing the CLC.

In the next phase (shown in FIG. 3c), an equivalence group 345 comprising CIs 316A, 316B and 316C may be established in destination IVN 320, e.g., as a result of one or more triggering requests or events generated by the migration manager. Each of the equivalence group instances may be configured such that they are capable of assuming the application processing responsibilities of the corresponding non load-balancing instances 315A, 315B and 315C of CIG 325. For example, the equivalence group instances may match the ASG instances in instance type, use the virtual machine images corresponding to the ASG instances, have the same network addresses assigned, and so on. In at least some embodiments, the migration manager may invoke one or more APIs exposed by an auto-scaling service manager to configure the equivalence group 345. In the state illustrated in FIG. 3c, application requests continue to flow via LBCI 315L to the CIs 315A, 315B and 315C.

Figure 3D:
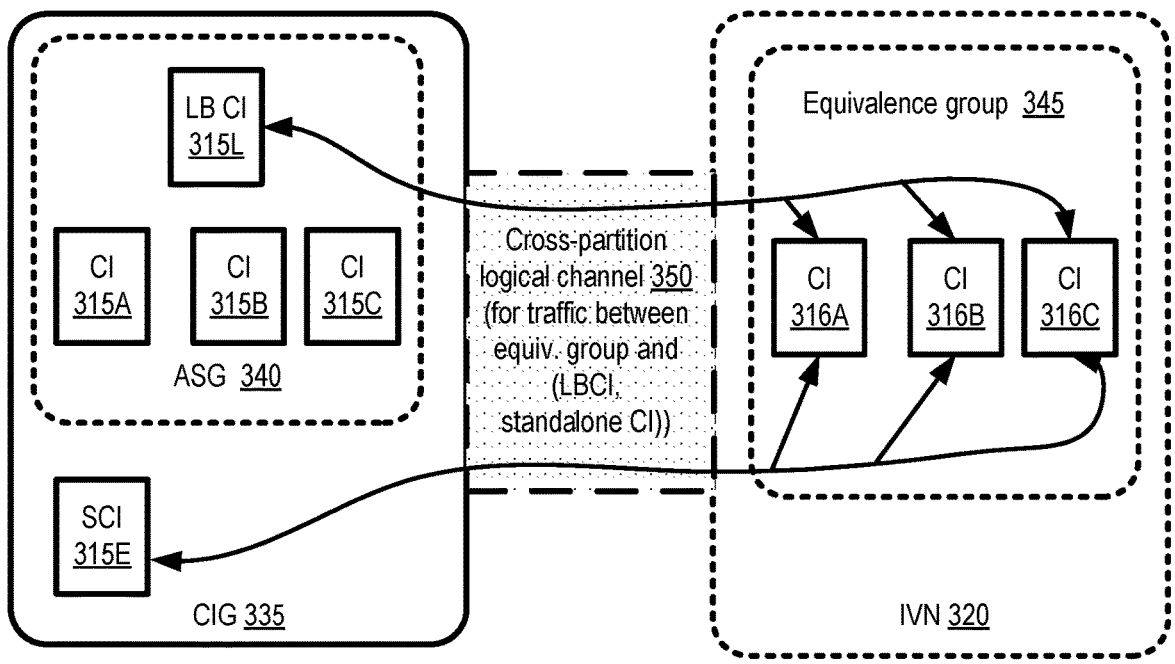

A cross-partition logical channel (CLC) 350 may then be established, as shown in FIG. 3d, to enable traffic to flow between various CIG resources that are in the source logical partition and the equivalence group 345. The establishment of the CLC 345 may include, for example, configuration settings changes associated with the LBCI 315L and the SCI 315E (e.g., these CIs may be added to one or more security groups defined in IVN 320) in some implementations. In at least one implementation, setting up the CLC may also require changes to the configuration of IVN 320 (e.g., a new security group may be created, and/or the equivalence group CIs may be added to a security group to be used for the CLC). The migration manager may initiate or perform the required configuration changes at one or both logical partitions in the depicted embodiment. At this stage of the migration, application requests received at the LBCI 315L may be distributed among the equivalence group CIs 316A-316C using the CLC 350, e.g., instead of among the CIG instances 315A-315C. In addition, the SCI 315E may begin communicating with the equivalence group CIs for various application-related operations instead of communicating with the original CIG instances 315A-315C.

Figure 3E:
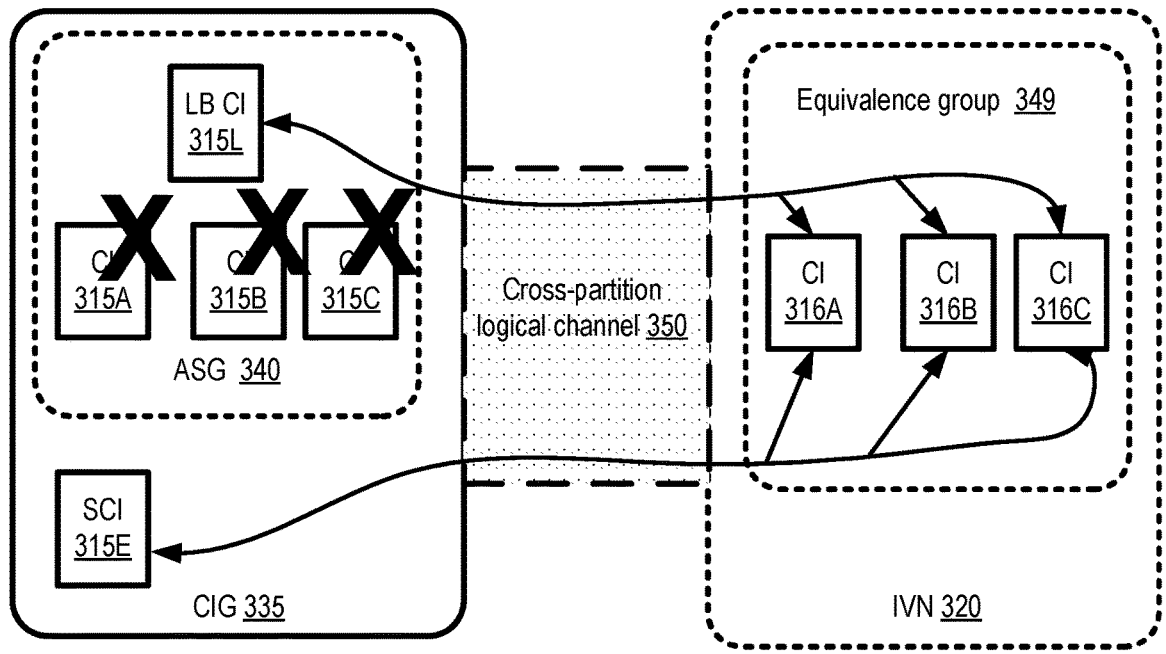
Figure 3F:
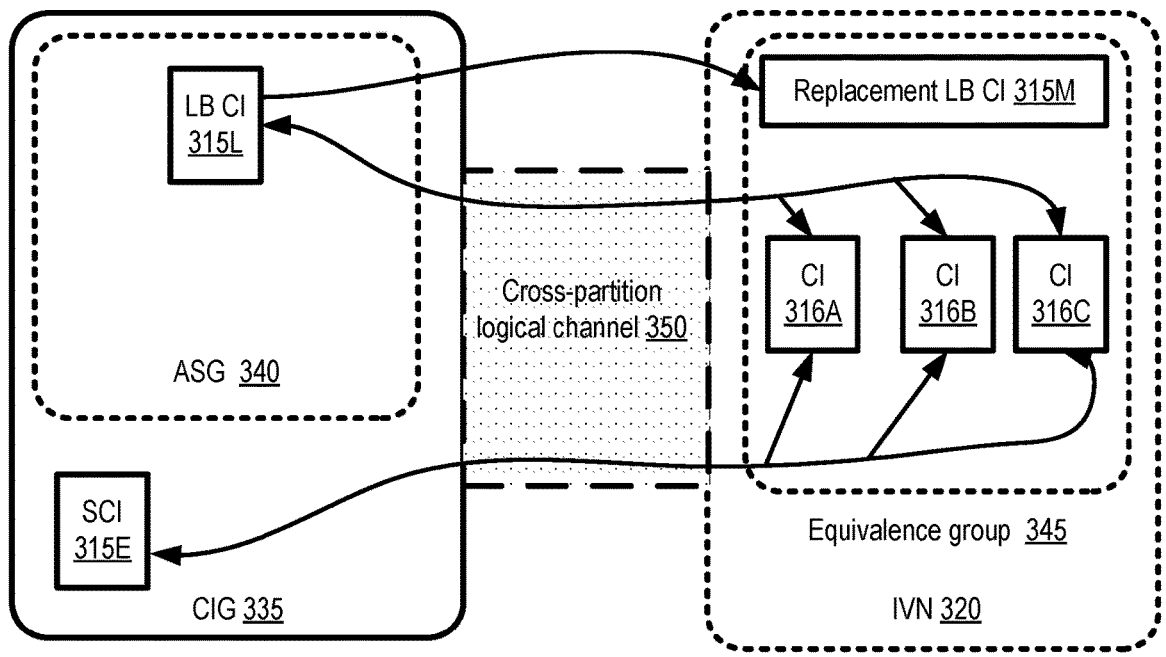
Figure 3G:
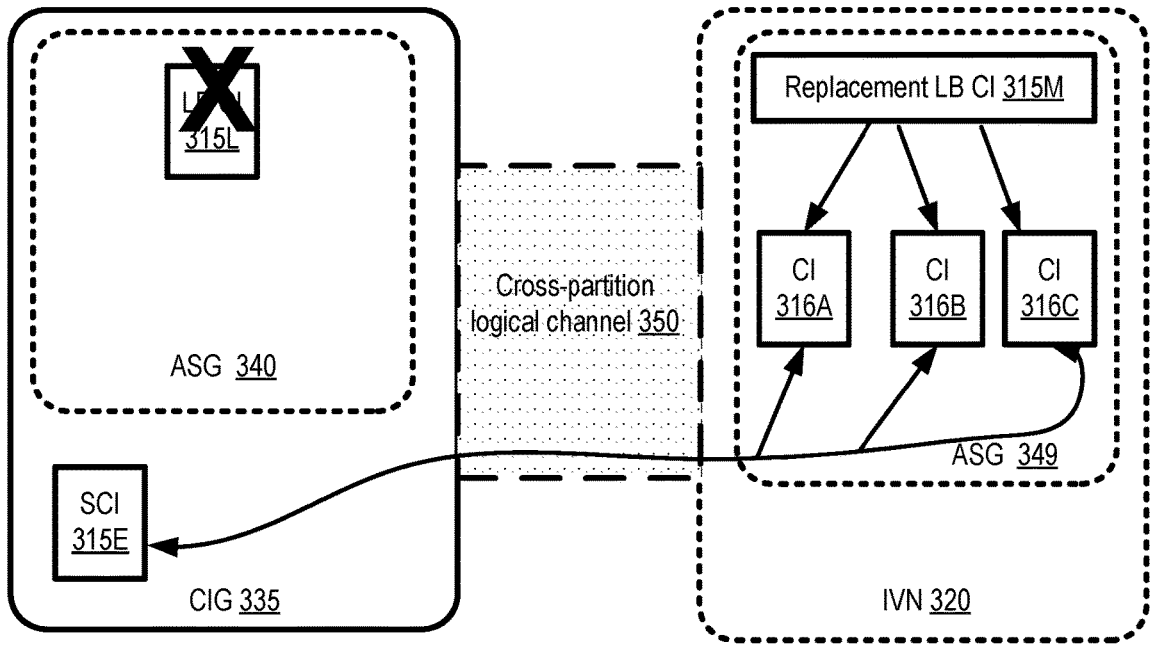

After the application-related responsibilities have been transferred to the equivalence group 345, the corresponding CIs 315A-315C may be terminated in the depicted embodiment, as indicated by the "X" symbols shown in FIG. 3e. In some embodiments, the migration manager may submit requests to, or generate triggers detected by, an ASM to terminate the CIS 315A-315C. In other embodiments, the disabling of the CIs indicated in FIG. 3e may be initiated automatically when the equivalence group instances are activated; that is, no additional requests or triggers may be required to disable the CIs. In the next phase of the migration, shown in FIG. 3f, a replacement load balancing instance 315M may be launched in the destination IVN 320, e.g., as a result of another trigger or request from the migration manager. The original LBCI 315L in the source logical partition may then be terminated, as indicated in FIG. 3g, e.g., in response to a new trigger or as part of the same operation in which the replacement load balancer is brought online. Network traffic may continue to flow between the SCI 315E and the equivalence group 345 via the LCL 350 at the stage illustrated in FIG. 3g.

Figure 3H:
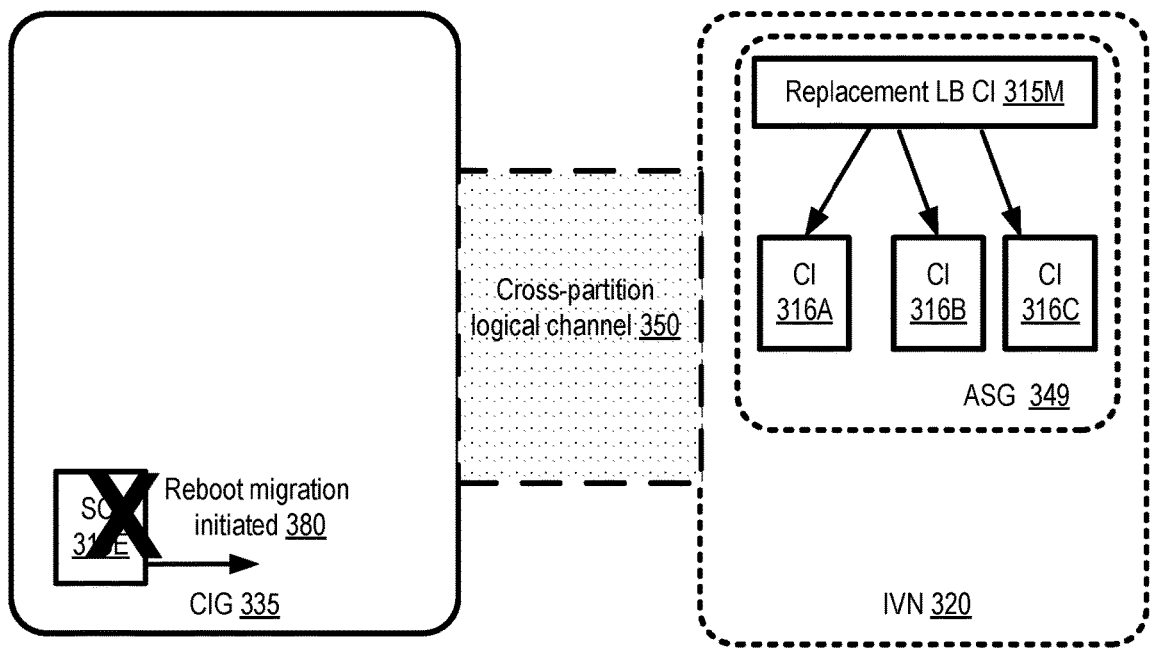
Figure 3I:
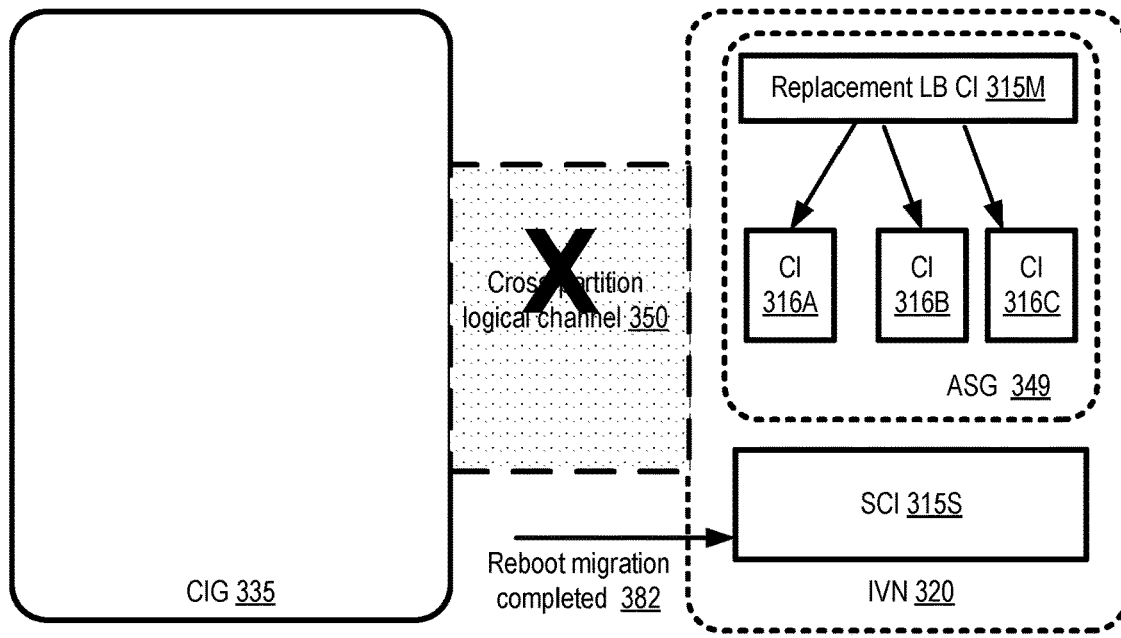
Figure 3J:
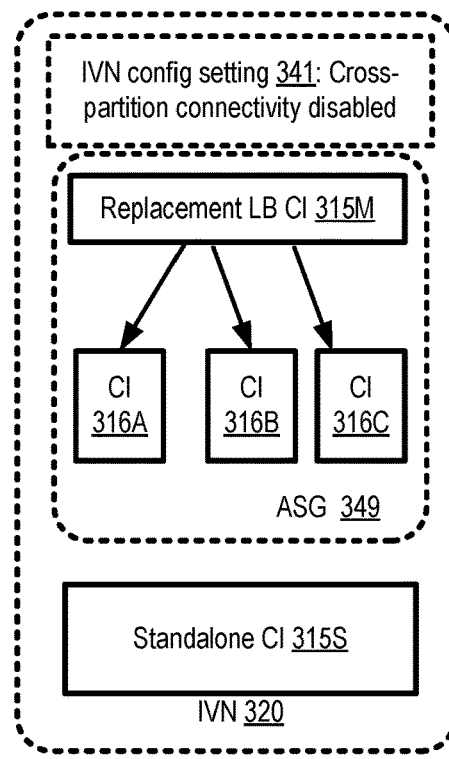

In at least some embodiments, the migration manager may initiate reboot migration 380 for the SCI 315E after the LBCI 315L has been terminated, as indicated in FIG. 3h. In contrast to the transfer of application responsibilities between the ASG instances 315A-315C and the equivalence group CIS 316A-316C, which may include zero (or close to zero) down-time for the applications running at the ASG, the reboot migration may include a brief period during which the applications running at the SCI 315E are offline. If the applications that were running on the SCI were stateful, for example, application state information may have to be captured at the SCI 315E and copied to a replacement CI in IVN 320, and during such a transition application requests directed at the SCI 315E may not be processed. The process of reboot migration may include, for example, the creation/ generation of a virtual machine image from SCI 315E, copying the machine image to a virtualization host in IVN 320, launching an instance from the image, and copying contents of one or more storage devices from SCI 315E to the newly-launched instance. As shown in FIG. 3i, after a replacement SCI 315S has been set up, in some embodiments the cross-channel logical channel 350 may be disabled at the initiative of the migration manager. In at least one embodiment, the configuration change 340 that enabled the establishment of the CLC 350 may be reversed or undone by the migration manager, as shown in configuration setting 341 of FIG. 3j. The migration procedure may then be deemed complete, as all the application-related operations that were previously being performed at CIG 335 have been successfully transferred to corresponding CIs in the destination IVN 320.

It is noted that at least some of the phases of the migration procedure may be performed in a different order than that shown in FIG. 3a-FIG. 3j, or in parallel with other phases. For example, in one embodiment, the configuration setting change 340 may be performed after the equivalence group is configured, instead of before setting up the equivalence group. In at least one embodiment, instead of scheduling the creation of the equivalence group before launching a replacement load balancing instance, the replacement load balancing instance may be launched first. Some steps of the illustrated migration procedure may be omitted in one embodiment—for example, the CLC 350 may not be disabled in some embodiments, or the IVN configuration changes that enable CLCs to be set up may not be reversed. In one embodiment, failover-based migration or live migration may be used for the standalone instance instead of reboot migration. In at least some embodiments, some or all of the operations shown in FIG. 3a-FIG. 3j may be implemented as atomic, reversible and/or idempotent transactions. In such embodiments, the migration procedure may be undone cleanly, returning the CIG to its original state, if one or more of the migration-related operations fails.

Selection of Migration Destinations Based on Availability Considerations

A provider network at which a VCS is implemented may be organized into a plurality of geographical regions in various embodiments, and each region may include one or more availability containers, which may also be termed "availability zones" herein. An availability container in turn may comprise portions or all of one or more distinct locations or data centers, engineered in such a way (e.g., with independent infrastructure components such as power-related equipment, cooling equipment, or physical security components) that the resources in a given availability container are insulated from failures in other availability containers. A failure in one availability container may not be expected to result in a failure in any other availability container; thus, the availability profile of a given resource is intended to be independent of the availability profile of resources in a different availability container. Various types of services and/or applications may therefore be protected from failures at a single location by launching multiple application instances in respective availability containers.

Figure 4:
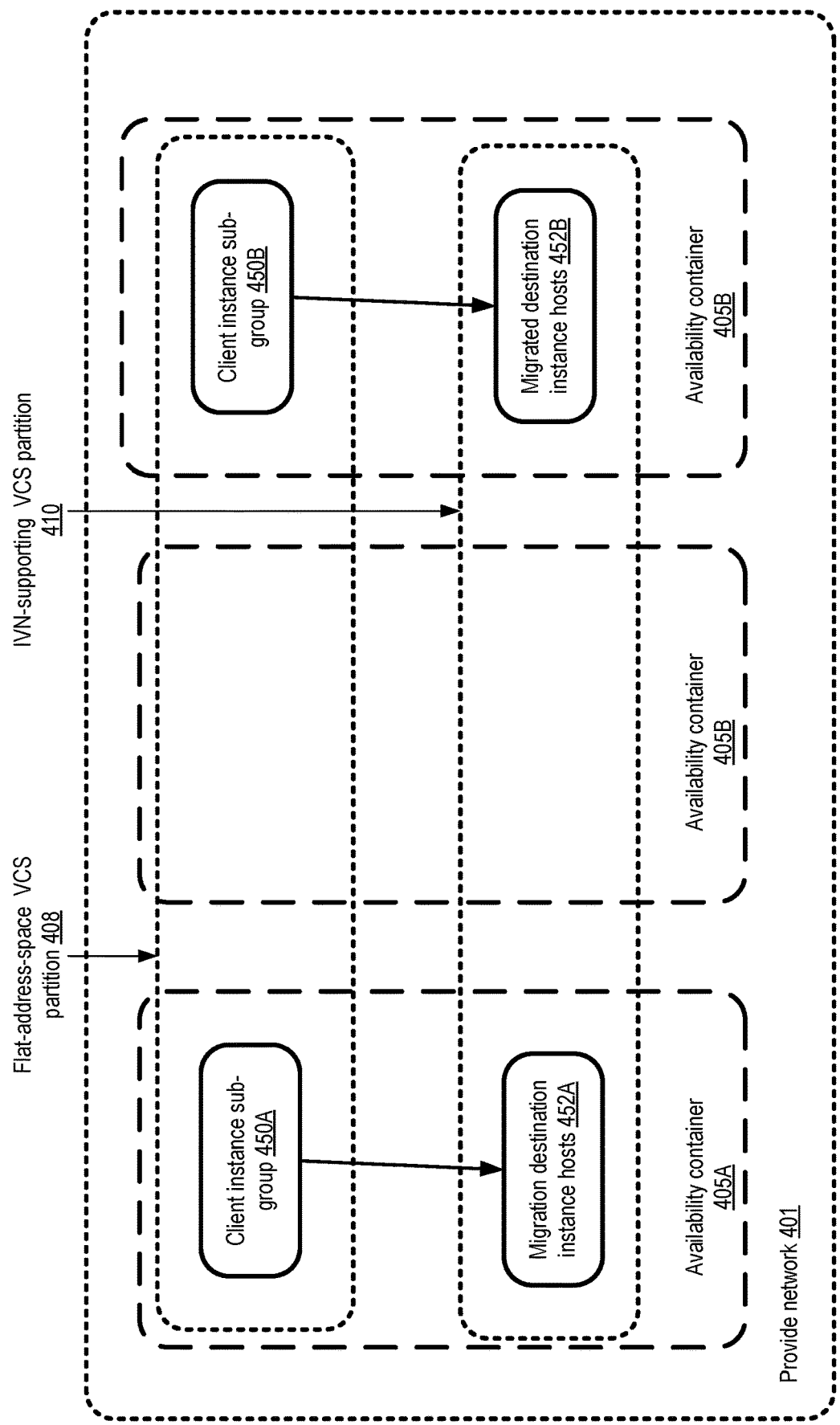
FIG. 4 illustrates an example of a migration of a client instance group whose compute instances may be distributed across multiple availability containers of a provider network, according to at least some embodiments.

FIG. 4 illustrates an example of a migration of a client instance group whose compute instances may be distributed across multiple availability containers of a provider network, according to at least some embodiments. In the embodiment shown in FIG. 4, provider network 401 comprises at least three availability containers 405A, 405B and 405C. The logical partitions of the VCS, such as a flat-address-space partition 408 and an IVN-supporting partition 410, may each include resources of the different availability zones. A given client instance group may comprise, for example, one sub-group of instances 450A located in availability container 405A, and another sub-group 450B located in a different availability container 405C. The client to whom the instances if the sub-groups are allocated may have selected the availability containers, e.g., at the time of instance launch, to obtain a desired level of availability and failure-resilience for the applications running on the instances. At least on some embodiments, when selecting the instance hosts to which CIG instances are to be migrated, the mappings between the original (pre-migration) instances and the availability containers may be preserved, so that applications retain approximately the same availability and/ or failure resilience characteristics as before the migration. That is, for example, CIs of sub-group 450A may be migrated to destination instance hosts 452A within the same availability container 405A in the depicted example. Similarly, CIs of sub-group 450B may be migrate to destination instance hosts located within the same availability container 405B. In some embodiments, as mentioned above, a placement manager may be used to identify the particular instance hosts to which a client's CIs are to be migrated. In one embodiment, clients may be able to indicate preferences for the availability containers to be used for their migrated CIs, e.g., using a programmatic interface of the kind illustrated in FIG. 5 and described below. In one embodiment, while the number of availability containers used for a given instance group post-migration may be the same as the number used pre-migration, a given instance of the group may be migrated across an availability container boundary. In some embodiments, the migration manager may not necessarily be responsible for ensuring that the level of availability supported prior to the migration of a CIG is maintained subsequent to the migration, and as a result the number of availability containers used after the migration may differ from the number used before the migration.

Migration-Related Client-Facing Programmatic Interfaces

Figure 5:
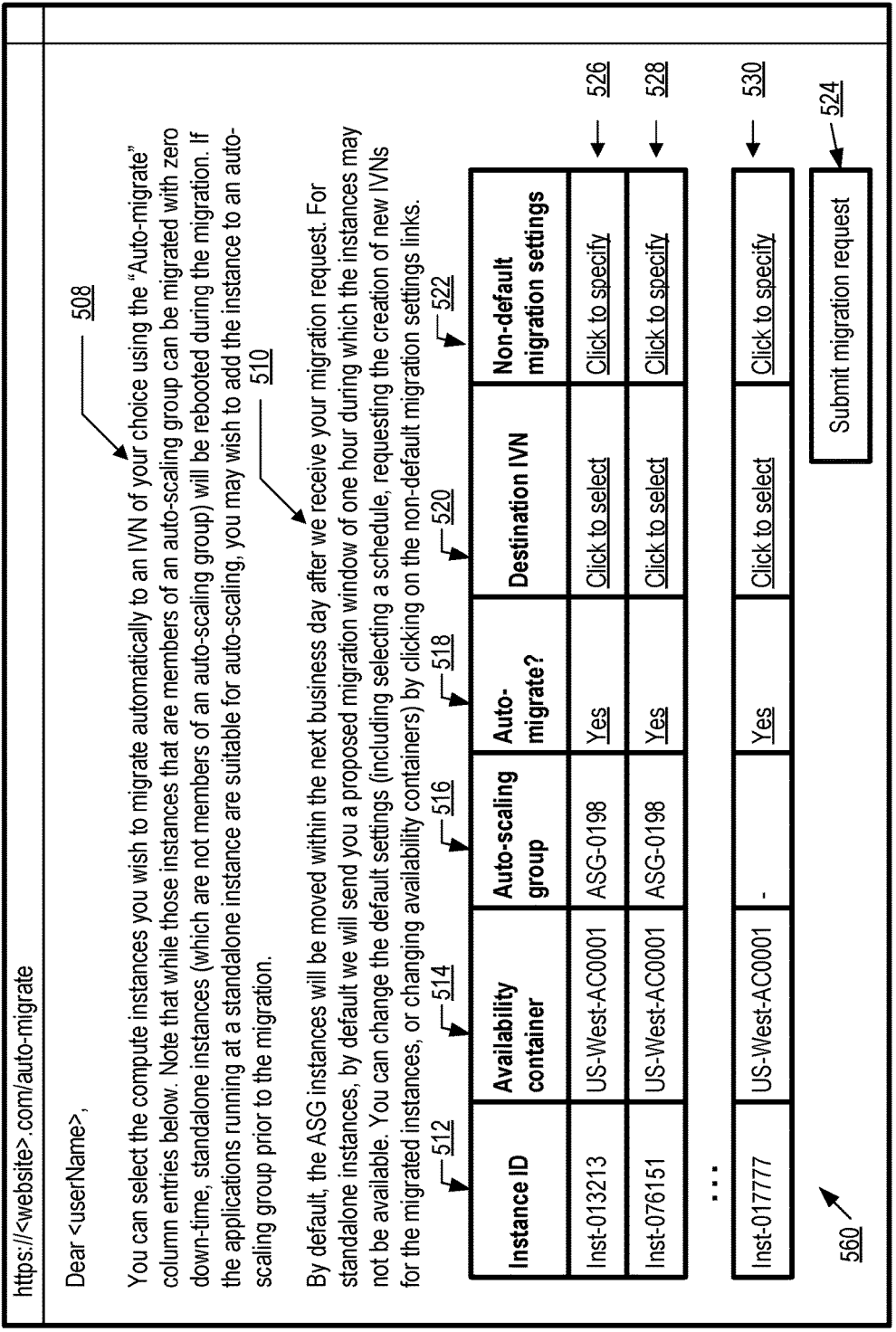
FIG. 5 illustrates an example of a web-based programmatic interface that may be used to determine client preferences regarding instance migration, according to at least some embodiments.

As mentioned earlier, in at least some embodiments clients may programmatically request or approve the migration of their compute instances. FIG. 5 illustrates an example of a web-based programmatic interface that may be used to determine client preferences regarding instance migration, according to at least some embodiments. To simplify the example, reboot migration is assumed to be the only available migration mechanism for standalone instances in the embodiment depicted in FIG. 5, although similar interfaces may also be employed in embodiments in which failover-based migration or live migration are available. As shown, the programmatic interface may comprise a web page 502 with a welcome message region 508 in which high-level information regarding the migration process may be provided. For example, the client may be informed that instances which are members of auto-scaling groups may be migrated without interruptions to the applications running on the instances, while standalone instances which are not part of an auto-scaling group may be rebooted during migration.

In region 510 of web page 502, the client may be provided some information regarding the default scheduling of the migration procedure. In the illustrated example, migration for ASG instances is promised within one business day after the client requests the migration. In contrast, a migration window of one hour may be proposed for the instances that are to be reboot migrated in the depicted example, and the client's approval of the proposal may be required for the reboot migrations to proceed. In at least some embodiments, more detailed information regarding the expected migration-related down time for one or more instances may be provided to the client.

A table 560 comprising a list of the instances currently allocated to the client may be displayed in web page 502 in the depicted example. In some embodiments, a web page control to filter or sort the list of instances may also be included in page 502—e.g., instances may be sorted by name, date of launch, IP addresses, etc. The instance identifiers may be indicated in column 512, and the identifiers of the availability containers may be shown in column 514. The auto-scaling group to which an instance belongs, if any, may be indicated in column 516. The client may be able to select a migration option for each instance using column 518 (e.g., "Yes" may be selected to indicate that the instance should be migrated automatically, or "No" may be selected to indicate that the instance is not to be migrated). In at least some embodiments, a client may be able to select a destination IVN, e.g., via a drop-down list of available IVNs in column 520. If the client wishes to specify non-default settings for the migration, such as a particular scheduling constraint (such as "do not migrate between 08:00 and 18:00 EDT"), a particular destination subnet within the destination IVN, or a different destination availability container than the one the instance is currently in, links provided in column 522 may be used in the depicted embodiment. After the client has made the desired selections regarding their instance migration, the "Submit migration request" button 524 may be used in the depicted embodiment to send the client preferences to the migration manager in the depicted embodiment.

A number of variants of the interface indicated in FIG. 5 may be used in various embodiments. In some embodiments, for example, APIs or command-line tools may be used to submit some or all of the kinds of preferences discussed above to the migration manager. In one embodiment, clients may be required to suggest schedules (e.g., time windows) within which they want various instances to be migrated, and so on. In one simple implementation, a client may simply opt-in for the automated migration of all their instances within a given logical partition of the VCS, and the migration manager may be responsible for determining the details such as the destination IVNs, the scheduling of the migrations, the order in which different subsets of the instances are migrated, and so on. In at least one implementation, the migration manager may establish a destination IVN to be used for at least some of the client's instances—e.g., a new IVN may be created to serve as a migration destination.

Methods for Automated Migration

Figure 6A:
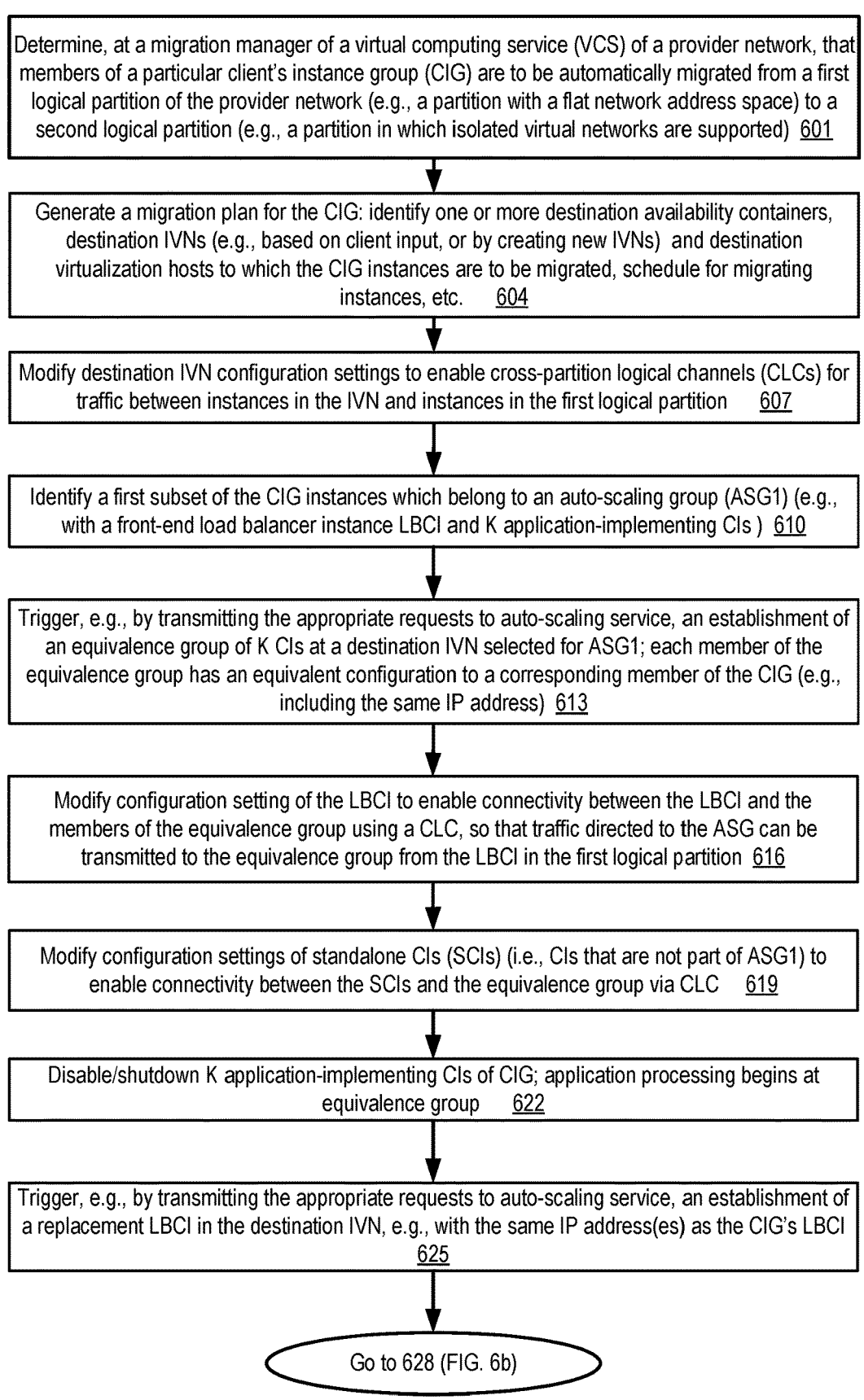
FIG. 6a and FIG. 6b collectively form a flow diagram illustrating aspects of operations that may be performed to automate the migration of groups of compute instances across logical partitions of a provider network, according to at least some embodiments.
Figure 6B:
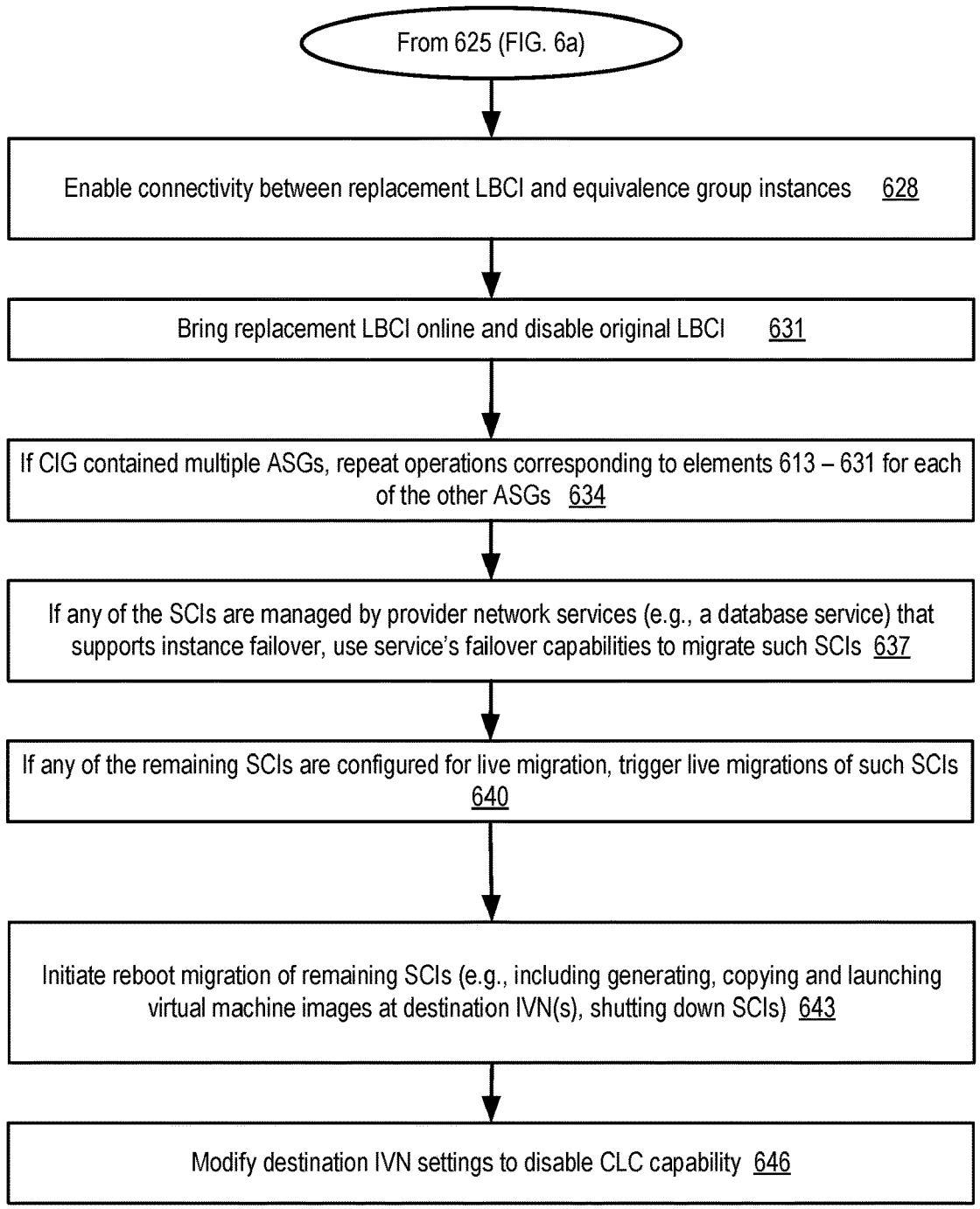

FIG. 6a and FIG. 6b collectively form a flow diagram illustrating aspects of operations that may be performed to automate the migration of groups of compute instances across logical partitions of a provider network, according to at least some embodiments. As shown in element 601, a migration manager of a provider network VCS may determine that a collection of compute instances allocated to or associated with a client is to be automatically migrated from one logical partition of the VCS (the source partition) to another logical partition (the destination partition). In at least some embodiments in which an auto-scaling service is implemented at the provider network, the client instance group (CIG) (the collection of compute instances to be migrated) may include one or more instances that belong to an auto-scaling group, and one or more instances which are not part of any auto-scaling group (and are therefore referred to as standalone CIs). The migration manager may comprise, for example, a set of administrative or control-plane components of the VCS, implemented using software and/or hardware resources at one or more computing devices. The destination partition may include a plurality of IVNs in some embodiments, into one of which the CIG is to be migrated. In at least some embodiments the source logical partition may be configured with a flat network address space in which IVNs are not permitted. In other embodiments both the source and destination logical partitions may include IVNs.

A migration plan may be generated for the CIG by the migration manager in the depicted embodiment (element 604). The migration plan may include, for example, one or more destination entities for the migration—e.g., one or more availability containers, IVNs, and/or virtualization hosts may be identified to be used for the migrated CIs. In addition, a schedule for the migration (including, for example, a sequence in which the individual CIG instances are to be migrated and/or one or more time windows during which various phases of the migration procedure are to be completed) may be identified as part of the plan in at least some embodiments at this stage. In some cases, one or more new IVNs may be set up to accommodate the migrated instances.

In at least some embodiments, a configuration setting of a destination IVN may be modified to enable the use of cross-partition logical channels (CLCs) (element 607). Such CLCs may be employed for network traffic during the migration procedure between instances that have been established at the destination IVN and instances of the CIG that are yet to be migrated, for example.

The migration manager may identify a set of CIs of the CIG which belong to a particular auto-scaling group (e.g., ASG1) (element 610) in the depicted embodiment. For example, ASG1 may include one instance (LBCI) configured as a load balancer, and K other instances which are configured to receive application requests from the load balancer instance and implement the appropriate processing operations to fulfill the requests. In at least some embodiments, the set of applications being run at the K instances may be stateless—e.g., minimal or no application state information may have to be propagated when a new instance joins the auto-scaling group.

The migration manager may initiate the establishment of an equivalence group of K instances, corresponding to the K non-load-balancing CIs of ASG1, in the destination IVN selected for ASG1 (element 613) in the depicted embodiment. In some embodiments, the migration manager may generate triggering events and/or send messages to an auto-scaling service manager to establish the equivalence group, while in other embodiments the migration manager may itself launch the instances of the equivalence group. Pre-created launch configuration records (LCRs) of the kind illustrated in FIG. 2 may be used to speed up the launch of the equivalence group instances in at least one embodiment—e.g., a virtual machine image indicated in an LCR may be obtained from a machine image repository and used to launch an equivalence group instance.

A CLC to be used for network packets flowing between the LBCI (e.g., packets indicative of application requests) and the equivalence group may be configured at this stage of the migration in the depicted embodiment. Configuration settings (e.g., security group settings) of the LBCI may be modified (element 616), for example, and/or settings of the destination IVN or the equivalence group may be changed. In at least one embodiment, a new security group may be configured for the destination IVN, and the equivalence group CIs as well as the LBCI may be added to the new security group. Similarly, configuration changes may be initiated or performed by the migration manager to enable connectivity between the equivalence group and standalone instances of the CIG (element 619).

After connectivity between the LBCI (which is in the source logical partition) and the equivalence group instances (in the destination IVN) is established, the original application-processing CIs of the CIG may no longer be required. Accordingly, in the depicted embodiment, the K CIs for which the equivalence group was instantiated may be disabled or shutdown (element 622). Application requests, which were previously being distributed by the LBCI among the other instances of the CIG in the source partition, may now be distributed among the instances of the equivalence group, and the equivalence group CIs may start processing the application requests. Users of the applications which were being implemented in ASG1 may experience no downtime in at least some embodiments, and may not be made aware that anything has changed with respect to their applications.

In the depicted embodiment, the next phase of the migration procedure may involve the establishment of a replacement load balancer instance in the destination IVN (element 625). A similar trigger or request may be sent to the auto-scaling manager in some embodiments, while the migration manager may itself launch a load balancing CI in other embodiments. In at least some embodiments, the migration manager may invoke an API supported by a load balancing service of the provider network to initiate the launch of the replacement LBCI. At least one network address which was assigned to the LBCI in the source partition may also be assigned to the replacement LBCI in the depicted embodiment. The configuration of the replacement LBCI may be amended to enable connectivity between it and the equivalence group CIs (element 628 of FIG. 6b). In some embodiments, more than one CI may be configured as a load balancer for ASG1, in which case the operations corresponding to element 625 may be repeated for each of the load balancing CIs.

The replacement LBCI may be brought online, and the original LBCI may be taken offline or disabled/terminated at this stage (element 631) in the depicted embodiment. If the CIG included multiple ASGs, the operations corresponding to ASG1 illustrated in element 613-631 may be repeated for each ASG (element 634). The standalone CIs may still remain in the source logical partition at this stage. In at least some embodiments, one or more of the standalone CIs may be managed by provider network services (such as relational or non-relational database services) which provide support for instance failovers. If any such instances are part of the CIG, the failover capabilities of the corresponding services may be invoked to migrate them (element 637). In one embodiment, one or more of the standalone CIs may be configured to enable live migration across logical partition boundaries (i.e., migration which results in zero or negligible downtime but does not involve the use of ASGs). Such standalone CIs may be live migrated in the depicted embodiment (element 640). To complete the migration of the CIG, reboot migrations may be initiated by the migration manager for each of the remaining standalone instances (element 643)—i.e., those standalone instances for which service-managed automated failover is not available and live migration is not available. Reboot migration may thus be considered the last resort for instance migration in the depicted embodiment, used only if none of the other mechanisms are available. The reboot migrations may include, for example, some combination of the following: generating, copying and launching virtual machine images from the standalone CIs, configuring replacement instance networking settings to maintain connectivity with the equivalence group, and/or copying storage device contents (which may include application state information). In at least one embodiment, the configuration settings of the destination IVN may be changed to disable the use of CLCs in a final step of the migration procedure (element 646).

It is noted that in various embodiments, some of the kinds of operations shown in FIG. 6 may be implemented in a different order than that shown in the figure, or may be performed in parallel rather than sequentially. For example, in some embodiments, the migration of several different ASGs of a given CIG may be performed in parallel. In another alternative implementation, the load balancing CIs may be migrated before the application processing CIs are migrated. In at least one embodiment, operations corresponding to element 607 may not be required; e.g., CLCs may be established without requiring separate IVN configuration changes.

Use Cases

The techniques described above, of automatically migrating compute instances with zero (or extremely short) down-times to logical partitions in which advanced features such as isolated virtual networks are supported, may be useful in a variety of provider network environments. Some clients of such provider networks may have implemented many applications in legacy or first-generation logical partitions, often on older hardware than may be available within newer logical partitions. Such clients may be eager to take advantage of the new features implemented in the newer logical partitions, but may be reluctant to do so if substantial manual configuration is required, or if long down-times would be encountered during the transfer of their applications to the newer partitions.

Illustrative Computer System

Figure 7:
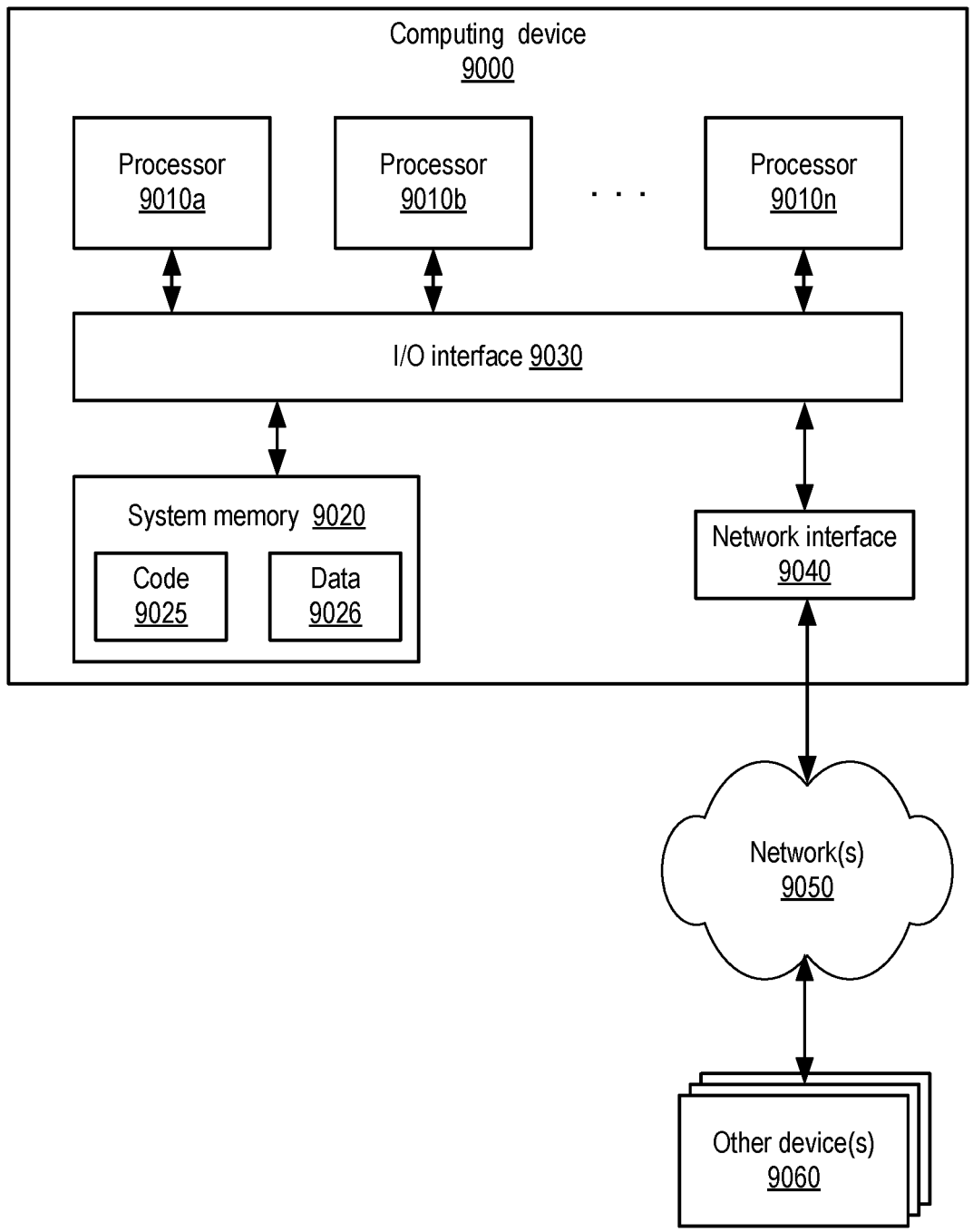
FIG. 7 is a block diagram illustrating an example computing device that may be used in at least some embodiments.

In at least some embodiments, a server that implements one or more of the techniques described above for automated migration of compute instance across logical partition boundaries (such as the functions of a migration manager, an auto-scaling service manager, a placement service manager, a load balancing service manager, a failover-supporting database service manager, or instance hosts) may include a general-purpose computer system that includes or is configured to access one or more computer-accessible media. FIG. 7 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a Low Pin Count (LPC) bus, a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 6, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may be one embodiment of a computer-accessible medium configured to store program instructions and data as described above for FIG. 1 through FIG. 6 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. Further, a computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 7 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A method, comprising:
    performing, at one or more computing devices:
        determining that a set of compute instances of a first logical partition of a virtual computing service is to be migrated to a second logical partition;
        causing connectivity to be established between (a) a first load balancer having a network address within the first logical partition and configured for a first subset of the set of compute instances and (b) one or more replacement compute instances, established in the second logical partition, corresponding to the first subset, wherein causing the connectivity to be established comprises modifying one or more network or security settings for the second logical partition to enable the connectivity between the first load balancer of the first logical partition and the one or more replacement compute instances of the second logical partition;
        initiating establishment, within the second logical partition, of a replacement load balancer for the first load balancer; and
        transferring, while continuing to service requests, load balancing of the requests from the first load balancer to the replacement load balancer established within the second logical partition.

2. The method as recited in claim 1, wherein transferring the load balancing comprises:
    assigning a network address to the replacement load balancer that is identical to that of the first load balancer; and
    disabling the first load balancer.

3. The method as recited in claim 1, further comprising performing, at the one or more computing devices:
    establishing a cross-partition logical channel between the first logical partition and the second logical partition.

4. The method as recited in claim 1, wherein at least some compute instances of the first set are configured within a first availability container of a provider network, and wherein at least one replacement compute instance of the one or more replacement compute instances is configured within a second availability container of the provider network.

5. The method as recited in claim 1, further comprising performing, at the one or more computing devices:
    instantiating at least one replacement compute instance of the one or more replacement compute instances using a launch configuration record of an auto-scaling service.

6. The method as recited in claim 1, further comprising performing, at the one or more computing devices:
    obtaining, via one or more programmatic interfaces, an indication of an isolated virtual network to which at least one compute instance of the set is to be migrated.

7. The method as recited in claim 1, further comprising performing, at the one or more computing devices:
    providing, via one or more programmatic interfaces, an indication of a proposed schedule for migrating at least one compute instance of the set;
    obtaining, via the one or more programmatic interfaces, a request to modify the proposed schedule; and
    scheduling a migration of the at least one compute instance based on the requested modification.

8. A system, comprising:
    one or more computing devices;
    wherein the one or more computing devices include instructions that upon execution on or across one or more processors cause the one or more computing devices to:
        determine that a set of compute instances of a first logical partition of a virtual computing service is to be migrated to a second logical partition;
        cause connectivity to be established between (a) a first load balancer having a network address within the first logical partition and configured for a first subset of the set of compute instances and (b) one or more replacement compute instances, established in the second logical partition, corresponding to the first subset, wherein causing the connectivity to be established comprises modifying one or more network or security settings for the second logical partition to enable the connectivity between the first load balancer of the first logical partition and the one or more replacement compute instances of the second logical partition;
        initiate establishment, within the second logical partition, of a replacement load balancer for the first load balancer; and
        transfer, while continuing to service requests, load balancing of the requests from the first load balancer to the replacement load balancer established within the second logical partition.

9. The system as recited in claim 8, wherein the set of compute instances includes at least one compute instance which is not part of the first subset, wherein the one or more computing devices include further instructions that upon execution on or across one or more processors further cause the one or more computing devices to:
    cause connectivity to be established between the at least one compute instance and the one or more replacement compute instances.

10. The system as recited in claim 8, wherein the one or more computing devices include further instructions that upon execution on or across one or more processors further cause the one or more computing devices to:
  disable, after the replacement load balancer has been established, a cross-partition logical channel between the first logical partition and the second logical partition, wherein disabling the cross-partition logical channel comprises restoring the one or more network or security settings modified as part of causing the connectivity to be established between the first load balancer and the one or more replacement compute instances.

11. The system as recited in claim 8, wherein at least some compute instances of the first set are configured within a first availability container of a provider network, and wherein at least one replacement compute instance of the one or more replacement compute instances is configured within the first availability container.

12. The system as recited in claim 8, wherein the one or more computing devices include further instructions that upon execution on or across one or more processors further cause the one or more computing devices to:
  instantiate at least one replacement compute instance of the one or more replacement compute instances using a launch configuration record of an auto-scaling service.

13. The system as recited in claim 8, wherein the one or more computing devices include further instructions that upon execution on or across one or more processors further cause the one or more computing devices to:
  obtain, via one or more programmatic interfaces, a request to establish an isolated virtual network; and
  migrate, to the isolated virtual network established in response to the request, at least one compute instance of the set.

14. The system as recited in claim 8, wherein the one or more computing devices include further instructions that upon execution on or across one or more processors further cause the one or more computing devices to:
  obtain, via one or more programmatic interfaces, an indication that one or more compute instances are not to be migrated automatically.

15. One or more non-transitory computer-accessible storage media storing program instructions that when executed on or across one or more processors cause one or more computer systems to:
  determine that a set of compute instances of a first logical partition of a virtual computing service is to be migrated to a second logical partition;
  cause connectivity to be established between (a) a first load balancer having a network address within the first logical partition and configured for a first subset of the set of compute instances and (b) one or more replacement compute instances, established in the second logical partition, corresponding to the first subset, wherein causing the connectivity to be established comprises modifying one or more network or security settings for the second logical partition to enable the connectivity between the first load balancer of the first logical partition and the one or more replacement compute instances of the second logical partition;
  initiate establishment, within the second logical partition, of a replacement load balancer for the first load balancer; and
  transfer, while continuing to service requests, load balancing of the requests from the first load balancer to the replacement load balancer established within the second logical partition.

16. The one or more non-transitory computer-accessible storage media as recited in claim 15, wherein the set of compute instances includes at least one compute instance which is not part of the first subset, storing further program instructions that when executed on or across the one or more processors further cause the one or more computer systems to:
  utilize a failover capability of a provider network service to migrate the at least one compute instance to the second logical partition.

17. The one or more non-transitory computer-accessible storage media as recited in claim 15, storing further program instructions that when executed on or across the one or more processors further cause the one or more computer systems to:
  assign, to the replacement load balancer, the network address of the first load balancer.

18. The one or more non-transitory computer-accessible storage media as recited in claim 15, wherein the replacement load balancer comprises another compute instance of the virtual computing service.

19. The one or more non-transitory computer-accessible storage media as recited in claim 15, storing further program instructions that when executed on or across the one or more processors further cause the one or more computer systems to:
  instantiate at least one replacement compute instance of the one or more replacement compute instances using a launch configuration record of an auto-scaling service.

20. The one or more non-transitory computer-accessible storage media as recited in claim 15, storing further program instructions that when executed on or across the one or more processors further cause the one or more computer systems to:
  add the first load balancer to a security group associated with the second logical network.

* * * * *